United States Patent
Choi et al.

(10) Patent No.: US 10,763,545 B2
(45) Date of Patent: Sep. 1, 2020

(54) ELECTROLYTE FOR SECONDARY BATTERY, METHOD OF PREPARING ELECTROLYTE, AND SECONDARY BATTERY INCLUDING ELECTROLYTE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Hongsoo Choi, Seoul (KR); Tomonobu Mizumo, Osaka (JP); Yonggun Lee, Incheon (KR); Wonseok Chang, Seoul (KR); Toshinori Sugimoto, Hwaseong-si (KR); Myungjin Lee, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 368 days.

(21) Appl. No.: 15/056,200

(22) Filed: Feb. 29, 2016

(65) Prior Publication Data
US 2017/0018800 A1    Jan. 19, 2017

(30) Foreign Application Priority Data
Jul. 17, 2015 (KR) .......................... 10-2015-0101991

(51) Int. Cl.
*H01M 10/052* (2010.01)
*H01M 10/0565* (2010.01)
(Continued)

(52) U.S. Cl.
CPC ......... *H01M 10/0565* (2013.01); *B01J 41/14* (2013.01); *C08F 12/26* (2013.01);
(Continued)

(58) Field of Classification Search
CPC ........................ H01M 10/052; H01M 10/0569
See application file for complete search history.

(56) References Cited

U.S. PATENT DOCUMENTS 5,650,244 A  *  7/1997  Shoji ................. H01M 10/0567
                                                      429/337

FOREIGN PATENT DOCUMENTS

JP        11-176701 A      7/1999
JP        2006182975   *   7/2006
                (Continued)

OTHER PUBLICATIONS

Le et al. (Ionics (2012) 18:817-827).*
(Continued)

*Primary Examiner* — Olatunji A Godo
(74) *Attorney, Agent, or Firm* — Cantor Colburn LLP

(57) ABSTRACT

An electrolyte for a secondary battery, the electrolyte including an ionic liquid polymer including a repeating unit represented by Formula 1:

Formula 1

(Continued)

wherein, in Formula 1, CY, $R_1$, $R_2$, $R_3$, $X_1^-$, n, and m are the same as described in the specification.

17 Claims, 14 Drawing Sheets

(51) Int. Cl.
    *B01J 41/14*     (2006.01)
    *C08F 112/14*     (2006.01)
    *C09D 125/18*     (2006.01)
    *H01M 10/05*     (2010.01)
    *C08F 12/26*     (2006.01)

(52) U.S. Cl.
    CPC .......... *C08F 112/14* (2013.01); *C09D 125/18* (2013.01); *H01M 10/05* (2013.01)

(56) References Cited

FOREIGN PATENT DOCUMENTS

| JP | 2009-059659 A | 3/2009 |
|----|---------------|--------|
| JP | 2010-285508 A | 12/2010 |
| KR | 1020120098260 A | 9/2012 |
| KR | 1020140046611 A | 4/2014 |

OTHER PUBLICATIONS

Vuillaume et al. (Chem. Mater. 2003, 15, 3625-3631).*
Madria et al., "Ionic liquid electrolytes for lithium batteries: Synthesis, electrochemical, and cytotoxicity studies", Journal of Power Sources, vol. 234, pp. 277-284.
Murata et al., "An overview of the research and development of solid polymer electrolyte batteries", Electrochimica Acta, vol. 45, 2000, pp. 1501-1508.
Shaplov et al.,. "Ionic IPNs as Novel Candidates for Highly Conductive Solid Polymer electrolytes", Journal of Polymer Science, Part A: Polymer Chemistry, vol. 47, 2009, pp. 4245-4266.
Tong et al., "Thermal Crosslinking of Poly(methyl methacrylate) by Reaction of Methyl Ester and Quaternary Ammonium Salt and Application to (Meth)Acrylate-Based TPEs", Journal of Polymer Science: Part A: Polymer Chemistry, vol. 37, 1999, pp. 4402-4411.
Uno et al., "Grafting of a Bicyclo Ortho Ester onto Polystyrenes Having Quaternary Ammonium Salt Moieties", Macromolecules, vol. 22, 1989, pp. 2502-2506.

* cited by examiner

ELECTROLYTE FOR SECONDARY BATTERY, METHOD OF PREPARING ELECTROLYTE, AND SECONDARY BATTERY INCLUDING ELECTROLYTE

CROSS-REFERENCE TO RELATED APPLICATION

This application claims priority to and the benefit of Korean Patent Application No. 10-2015-0101991, filed on Jul. 17, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrolyte for a secondary battery, a method of preparing the electrolyte, and a secondary battery including the electrolyte.

2. Description of the Related Art

Secondary batteries, for example, lithium secondary batteries, have one of the highest energy densities among commercialized secondary batteries. Lithium secondary batteries are used in various fields, for example, electrical vehicles.

When lithium metal or a lithium metal alloy is used as a negative electrode of a lithium secondary battery containing a liquid electrolyte, the lithium metal or the lithium metal alloy may be degraded due to the reactivity of lithium with moisture or oxygen. In addition, dendrites can be formed on the lithium metal or the lithium metal alloy negative electrode. Thus, a lithium secondary battery including the lithium negative electrode, such as the lithium metal or the lithium metal alloy may have decreased capacity and lifespan. Therefore, there is a need to address this chemical instability problem.

SUMMARY

Provided is an electrolyte for a secondary battery, the electrolyte having excellent mechanical properties and ion conductivity at room temperature.

Provided is a method of preparing the electrolyte, whereby the electrolyte may be readily prepared at room temperature.

Provided is a secondary battery that includes the electrode, thereby having excellent electrochemical stability and charging and discharging characteristics.

Additional aspects will be set forth in part in the description which follows and, in part, will be apparent from the description, or may be learned by practice of the presented exemplary embodiments.

According to an aspect of an exemplary embodiment, an electrolyte for a secondary battery includes an ionic liquid polymer including a repeating unit represented by Formula 1:

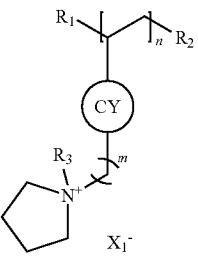

Formula 1 wherein, in Formula 1,

CY is selected from a substituted or unsubstituted non-fused 6-membered aromatic ring, a substituted or unsubstituted fused $C_{10}$-$C_{30}$ 6-membered aromatic ring, or a combination of at least two of the foregoing aromatic rings linked through a single bond or a $C_1$-$C_{20}$ alkylene group;

$R_1$, $R_2$, and $R_3$ are each independently selected from a hydrogen atom, a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof; n is an integer selected from 1 to 5,000, and m is an integer selected from 1 to 1,000; and $X_1^-$ is at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

According to an aspect of another exemplary embodiment, provided is a method of preparing an electrolyte for a secondary battery, the method including:

providing a monomer represented by Formula 3;

in-situ polymerizing the monomer represented by Formula 3 to obtain the electrolyte for a secondary battery:

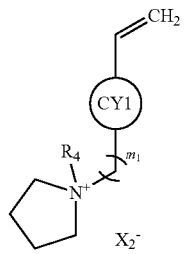

Formula 3 wherein, in Formula 3,

CY1 may be selected from a substituted or unsubstituted non-fused 6-membered aromatic ring, a substituted or unsubstituted fused $C_{10}$-$C_{30}$ 6-membered aromatic ring, or a combination of at least two of the foregoing aromatic rings linked through a single bond or a $C_1$-$C_{20}$ alkylene group;

$R_4$ is selected from a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof;

$m_1$ may be an integer selected from 1 to 1,000;

$X_2^-$ may be at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

According to another aspect of another exemplary embodiment, a secondary battery includes:
a positive electrode;
a negative electrode; and
an electrolyte disposed between the positive electrode and the negative electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
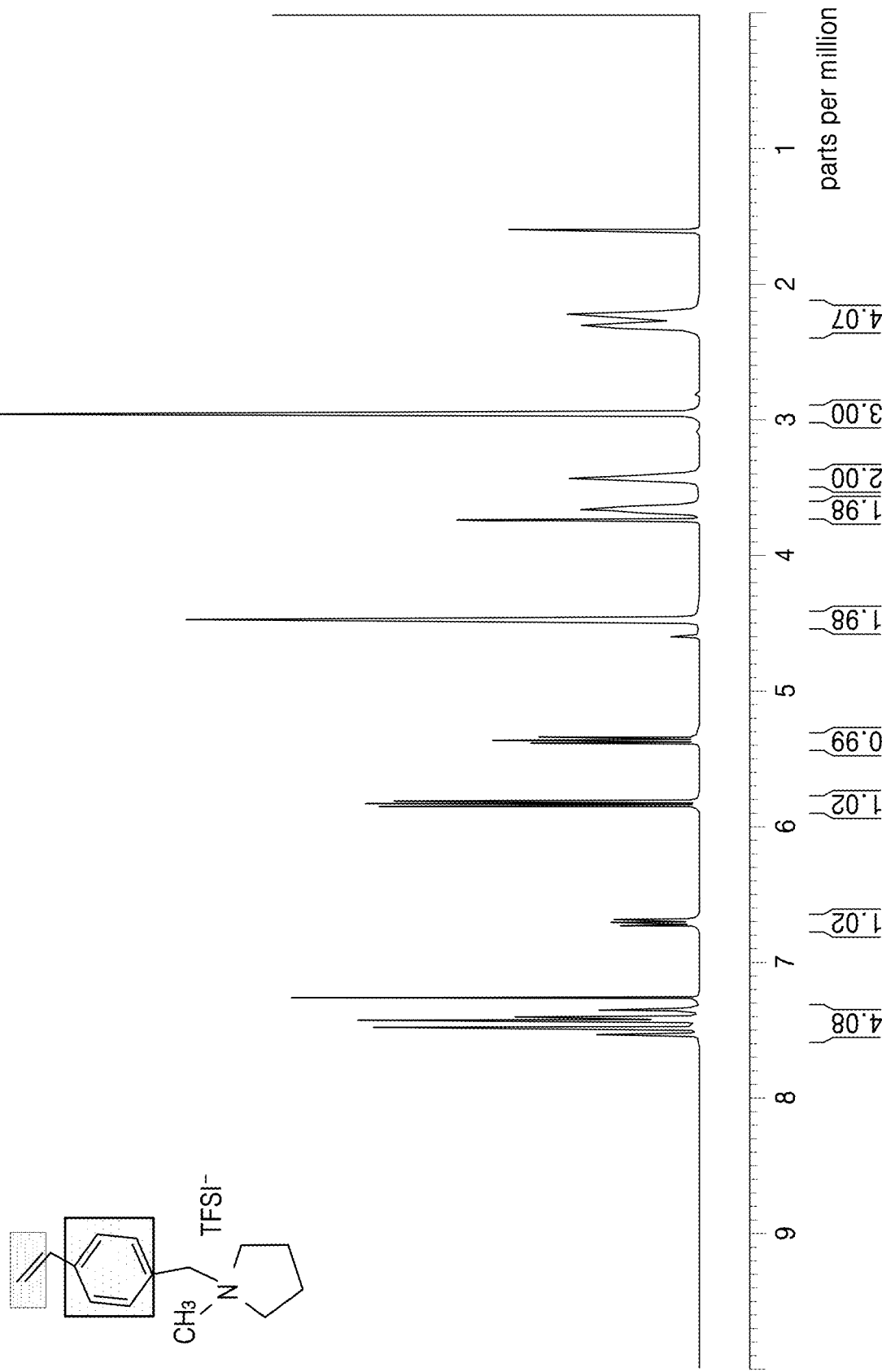
FIGS. 1A and 1B are graphs of signal intensity (arbitrary units, a. u.) versus chemical shift (parts per million, ppm) showing the results of $^1$H-NMR analysis of an electrolyte composition of a monomer for forming an ionic liquid polymer used in Example 1.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Rather, these embodiments are provided so that this disclosure will be thorough and complete, and will fully convey the effects and features of the present disclosure and ways to implement the present disclosure will fully convey the concept of the invention to those skilled in the art. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. In the drawings, like reference numerals denote like elements throughout, and thus redundant description thereof will be omitted.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." As used herein, the terms such as "comprising", "including", "having", or the like are intended to indicate the existence of the features regions, integers, steps, operations, components, and/or elements disclosed in the specification, and are not intended to preclude the possibility that one or more other features or elements may exist or may be added.

It will also be understood that when an element such as a layer, a region or a component is referred to as being "on" another layer or element, it can be directly on the other layer or element, or intervening layers, regions, or components may also be present. In contrast, when an element is referred to as being "directly on" another element, there are no intervening elements present.

In the drawings, the sizes of elements are exaggerated or reduced for ease of description. The size or thickness of each element shown in the drawings are arbitrarily illustrated for better understanding or ease of description, and thus the present disclosure is not limited thereto.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, with reference to attached drawings, an electrolyte for a secondary battery, a method of preparing the electrolyte, and a secondary battery including the electrolyte according to an exemplary embodiment will be described in detail. However, these are for illustrative purposes only and are not intended to limit the scope of the inventive concept. The scope of the inventive concept is indicated by the claims rather than by the detailed description.

It will be understood that the term "a combination thereof" as used herein refers to a mixture or combination inclusive of two or more components.

According to an exemplary embodiment, an electrolyte for a secondary battery may include an ionic liquid polymer including a repeating unit represented by Formula 1:

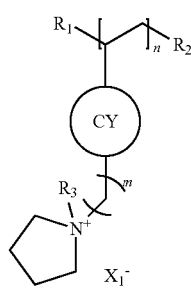

Formula 1 wherein, in Formula 1,

CY may be selected from a substituted or unsubstituted non-fused 6-membered aromatic ring, a substituted or unsubstituted fused $C_{10}$-$C_{30}$ 6-membered aromatic ring, or a combination of at least two of the foregoing aromatic rings linked through a single bond or a $C_1$-$C_{20}$ alkylene group;

$R_1$, $R_2$, and $R_3$ may be each independently selected from a hydrogen atom, a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof;

n may be an integer selected from 1 to 5,000, and m may be an integer selected from 1 to 1,000; and $X_1^-$ may be at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In search of a new negative active material for secondary batteries, to replace conventional carbonaceous materials, such as graphite, research on metal oxides, such as silicon or tin oxide having a high theoretical capacity and a lithium metal having the highest ion capacity (of about 4200 mAh/g) has been actively conducted.

However, using the lithium metal or the like in secondary batteries may be problematic due to a danger of explosion caused by the high reactivity of the lithium metal or the like with moisture or oxygen.

The main cause of this problem is the growth of dendrites on the surface of lithium metal or the like, which causes formation of dead lithium. The growth of dendrites occurs when a dissociated lithium salt or a solvent in an electrolyte of a secondary battery is partially decomposed through an electrochemical reaction, and the decomposition reaction products are accumulated on the lithium metal or the like. As the secondary battery undergoes charging and discharging, the grown dendrite may be separated from the surface of the lithium metal or the like, making it difficult to contact the electrode. Thus, there is a problem of drastic decrease of capacity and cycle characteristics in such batteries.

The electrolyte for a secondary battery according to an exemplary embodiment may include CY in Formula 1, and thus, the electrolyte may have improved mechanical properties even without including a cross-linking agent or inorganic particles, unlike conventional ionic liquids or ionic liquids polymer.

CY in Formula 1 may be selected from a substituted or unsubstituted non-fused 6-membered aromatic ring, a substituted or unsubstituted fused $C_{10}$-$C_{30}$ 6-membered aromatic ring, or a combination of at least two of the foregoing aromatic rings linked through a single bond or a $C_1$-$C_{20}$ alkylene group. The non-fused 6-membered aromatic ring may be a benzene ring. The term "fused $C_{10}$-$C_{30}$ 6-membered aromatic ring" as used herein refers to a polycyclic aromatic ring having a relatively large number of carbon atoms, for example, a number of carbon atoms in a range of about 10 to about 30, and formed by linking benzene rings.

CY in Formula 1 may include 6-membered aromatic ring selected from a substituted or unsubstituted benzene ring, a substituted or unsubstituted naphthalene ring, a substituted or unsubstituted anthracene ring, a substituted or unsubstituted phenalene ring, a substituted or unsubstituted phenanthrene ring, a substituted or unsubstituted pyrene ring, a substituted or unsubstituted chrysene ring, a substituted or unsubstituted naphthacene ring, a substituted or unsubstituted picene ring, a substituted or unsubstituted pentaphene ring, and a substituted or unsubstituted hexacene ring, or a combination of at least two of the foregoing linked through a single bond or a $C_1$-$C_{20}$ alkylene group. For example, CY in Formula 1 may include at least one 6-membered aromatic ring selected from a substituted or unsubstituted benzene ring, a substituted or unsubstituted naphthalene ring, and a substituted or unsubstituted anthracene ring, or a combination of at least two of the foregoing linked through a single bond or a $C_1$-$C_{20}$ alkylene group.

Definitions of the substituents used in Formulae 1, 2, and 3 are as follows.

An alkyl group, an alkoxy group, and an alkylene oxide group used in Formula 1 may include a "substituent" selected from a halogen atom, a $C_1$-$C_{20}$ alkyl group substituted with a halogen atom, such as $CCF_3$, $CHCF_2$, $CH_2F$, or $CCl_3$, a hydroxy group, a nitro group, a cyano group, an amino group, an amidino group, a hydrazine group, a hydrazone group, a carboxylic acid group or a salt thereof, a sulfonic acid group or a salt thereof, and a phosphoric acid group a salt thereof; or a "substituent" substituted with at least one selected from a $C_1$-$C_{20}$ alkyl group, a $C_2$-$C_{20}$ alkenyl group, a $C_2$-$C_{20}$ alkynyl group, a $C_3$-$C_{20}$ cycloalkyl group, a $C_6$-$C_{20}$ aryl group, a $C_6$-$C_{20}$ heteroaryl group, a $C_6$-$C_{20}$ aryl alkyl group, and a $C_6$-$C_{20}$ heteroaryl alkyl group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_1$-$C_{20}$ alkyl" refers to a $C_1$-$C_{20}$ alkyl group substituted with $C_6$-$C_{20}$ aryl group, the total number of carbon atoms in the resulting aryl substituted alkyl group is $C_7$-$C_{40}$.

The halogen atom used in Formula 1, 2, and 3 as a substituent may include a fluorine, bromine, chlorine, and iodine.

The $C_1$-$C_{20}$ alkyl group used in Formula 1, 2, and 3 as a substituent refers to a group derived from a saturated branched or non-branched (straight chain or linear) $C_1$-$C_{20}$ hydrocarbon. Detailed examples thereof may include a methyl group, an ethyl group, a propyl group, an iso-butyl group, a sec-butyl group, a tert-butyl group, a neo-butyl group, an iso-amyl group, and a hexyl group. At least one hydrogen in the $C_1$-$C_{20}$ alkyl group may be substituted with a substituent as described above.

The $C_1$-$C_{20}$ alkoxy group used in Formula 1, 2, and 3 as a substituent refers to an alkyl group bound to an oxygen. Detailed examples thereof may include a methoxy group, an ethoxy group, and a propoxy group. At least one hydrogen in the $C_1$-$C_{20}$ alkoxy group may be substituted with a substituent, such as the substituents described in the "substituent".

The $C_1$-$C_{20}$ heteroalkyl group used in Formula 1, 2, and 3 as a substituent refers to an alkyl group as defined above in which at least one carbon atom is replaced with a heteroatom selected from nitrogen (N), oxygen (O), phosphorus (P), or sulfur (S) and having carbon as remaining atoms. Non-limiting examples of the heteroalkyl are methylthio, dimethylamino, and the like. The $C_1$-$C_{20}$ heteroalkyl group does not include the $C_1$-$C_{20}$ alkoxy group.

The $C_2$-$C_{20}$ alkylene oxide group used in Formulae 1, 2, and 3 as a substituent refers to an alkylene group bound to an oxygen. Detailed examples thereof may include an ethylene oxide, a propylene oxide, and a butylene oxide.

The $C_2$-$C_{20}$ alkenyl group used as a substituent herein refers to a group having a number of carbon atoms in a range of 2 to 20 and derived from a branched or unbranched hydrocarbon with at least one carbon-carbon double bond. Detailed examples thereof may include vinylene and allylene.

The $C_2$-$C_{20}$ alkynyl group used as a substituent herein refers to a group having a number of carbon atoms in a range of 2 to 20 and derived from a branched or unbranched hydrocarbon with at least one carbon-carbon triple bond. Detailed examples thereof may include an ethynyl group, a butenyl group, an iso-butenyl group, and an iso-propynyl group.

The $C_3$-$C_{20}$ cycloalkyl group used in Formula 1, 2, and 3 as a substituent refers to a saturated $C_1$-$C_{20}$ hydrocarbon ring system in which one of the hydrogen atoms is removed from one of the ring carbons. Detailed examples thereof may include a cyclopropyl group, a cyclobutyl group, a cyclopentyl group, and a cyclohexyl group.

The $C_1$-$C_{20}$ cycloalkyloxy group used in Formula 1, 2, and 3 as a substituent refers to a cycloalkyl group bound to an oxygen. Detailed examples thereof may include a cyclopropyloxy group, a cyclobutyloxy group, and a cyclopentyloxy group. At least one hydrogen in the $C_1$-$C_{20}$ cycloalkoxy group may be substituted with a substituent, such as the substituents described in the "substituent".

The $C_3$-$C_{20}$ heterocycloalkyl group used in Formula 1, 2, and 3 as a substituent refers to a $C_3$-$C_{20}$ cycloalkyl group in which one of the ring carbons is replaced with a heteroatom selected from nitrogen (N), oxygen (O), phosphorus (P), or sulfur (S). Detailed example thereof may include a 2-tetrahydrofuranyl group.

The $C_6$-$C_{30}$ aryl group used in Formula 1, 2, and 3 as a substituent, which is used alone or in combination, refers to an aromatic system containing at least one ring. Detailed examples thereof may include a phenyl group, a naphthyl group, and a tetrahydronaphthyl group.

The $C_6$-$C_{30}$ aryloxy group used in Formula 1, 2, and 3 as a substituent, which is used alone or in combination, refers to the $C_6$-$C_{30}$ aryl group bound to an oxygen. Detailed examples thereof may include a phenoxy group, a naphthoxy group, and a tetrahydronaphthoxy group.

The $C_3$-$C_{30}$ heteroaryl group used as a substituent herein refers to an organic compound including at least one hetero atom selected from N, O, P, and S, wherein the rest of the cyclic atoms are all carbon atoms. Detailed example thereof may include a pyridyl group.

The $C_3$-$C_{30}$ heteroaryloxy group used in Formula 1, 2, and 3 as a substituent, which is used alone or in combination, refers to the $C_3$-$C_{30}$ heteroaryl group bound to an oxygen. Detailed example thereof may include a 2-pyridyloxy group.

The $C_7$-$C_{30}$ arylalkyl group and the $C_4$-$C_{30}$ heteroarylalkyl group used as a substituent in Formula 1, 2, and 3 refer to an alkyl group bound to an aryl group and an alkyl group bound to a heteroaryl group, respectively.

CY in Formula 1 may be bound to an alkylene group between the pyrrolidinium cations. Variable m indicates the number of carbon atoms in the alkylene group. For example, m may be an integer selected from 1 to 100, for example, an integer selected from 1 to 20.

While not wishing to be bound by theory, it is understood that when the alkylene group has a number of carbon atoms within these ranges, the alkylene group may migrate with the pyrrolidinium cation, thus facilitating migration of alkali metal ions or alkaline earth metal ions, such as lithium ions, during the charging and discharging of a secondary battery. Accordingly, conductivity of lithium ions in the electrolyte including an ionic liquid polymer may improve. In addition, the electrolyte including an ionic liquid polymer may include the alkylene group, thereby improving modulus.

The potential window of the ionic liquid polymer including the pyrrolidinium cation in Formula 1 may be have a wide potential range from about −0.4 Volts (V) to about 6.2 V. Whereas the potential window of an ionic liquid polymer including a conventional imidazolium cation is in a range of about 0.5 V to about 3.5 V.

When an electrolyte includes the ionic liquid polymer including the pyrrolidinium cation in Formula 1 having a wide potential range, the amount of products generated by partially decomposed lithium salts or solvents due to an electrochemical reaction dissociated in the electrolyte is significantly less than that of the electrolyte including an ionic liquid polymer including an imidazolium cation.

Accordingly, the electrolyte including the ionic liquid polymer of Formula 1 including the pyrrolidinium cation may have excellent electrochemical stability even at a high voltage, for example, 3.5 V or greater, for example, 3.8 V or greater, than the electrolyte including an ionic liquid polymer including an imidazolium cation. Thus, a variety of solvents may be used in the battery. In addition, due to this characteristic, by using the electrolyte including the ionic liquid polymer including the pyrrolidinium cation in Formula 1, uneven distribution of charges on a surface of a lithium metal or the like may be prevented, allowing adjusting dendrite morphology.

The weight average molecular weight (Mw) of the ionic liquid polymer may be in a range of about 500 Daltons to about 1,000,000 Daltons, for example, from about 10,000 Daltons to about 100,000 Daltons. While not wishing to be bound by theory, it is understood that when the weight average molecular weight (Mw) of the ionic liquid polymer is within this range, an electrolyte having improved mechanical properties and ion conductivity at room temperature may be obtained.

The ionic liquid polymer may be, for example, an ionic liquid polymer represented by Formula 2:

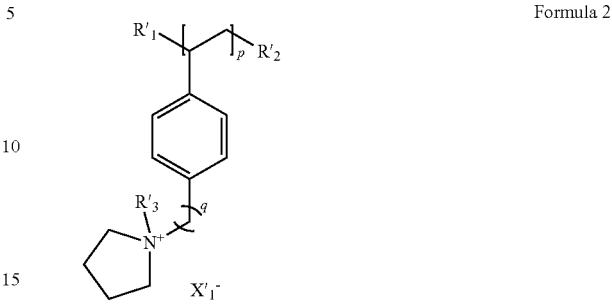

Formula 2 wherein, in Formula 2, $R_1'$, $R_2'$, and $R_3'$ may be each independently selected from a hydrogen atom, a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof;

p may be an integer selected from 1 to 500, and q may be an integer selected from 1 to 100; and $X_1^-$ may be at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

A "substituted or unsubstituted $C_1$-$C_{20}$ alkyl group", a "substituted or unsubstituted $C_1$-$C_{20}$ alkoxy group", and a "$C_2$-$C_{20}$ alkylene oxide group" used in Formula 2 may be the same as defined in Formula 1.

The electrolyte may include at least one selected from an alkali metal salt and an alkaline earth metal salt. The at least one selected from an alkali metal salt and an alkaline earth metal salt may include at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2CF_2CF_3)_2$, $LiSbF_6$, $LiPF_3(CF_2CF_3)_3$, $LiPF_3(CF_3)_3$, $LiB(C_2O_4)_2$, NaSCN, $NaSO_3CF_3$, KTFSI, NaTFSI, $Ba(TFSI)_2$, $Pb(TFSI)_2$, and $Ca(TFSI)_2$. For example, the alkali metal salt and the alkaline earth metal salt may be a lithium salt selected from $LiClO_4$, $LiCF_3SO_3$, $LiBF_4$, $LiN(CF_3SO_2)_2$, $LiN(SO_2F)_2$, $LiPF_6$, $LiAsF_6$, $LiSbF_6$, and $LiPF_3(CF_2CF_3)_3$.

The electrolyte including the alkali metal salt and the alkaline earth metal salt may have excellent lithium ion mobility and ion conductivity, and may effectively suppress growth of dendrite on the surface of a negative electrode.

The amount of the alkali metal salt and the alkaline earth metal salt may be in a range of about 0.01 part by weight to about 100 parts by weight based on 100 parts by weight of the ionic liquid polymer, for example, about 10 parts by weight to about 100 parts by weight based on 100 parts by weight of the ionic liquid polymer, for example, about 20 parts by weight to about 100 parts by weight based on 100 parts by weight of the ionic liquid polymer. When an electrolyte includes the alkali metal salt and the alkaline earth metal salt within these ranges, a secondary battery including the electrolyte may have improved electrochemical stability and charging and discharging characteristics.

The electrolyte may further include at least one selected from a liquid electrolyte, a solid electrolyte, a gel electrolyte, a plurality of inorganic particles, and a separator.

The liquid electrolyte may include at least one selected from an organic solvent, an alkali metal salt, and an alkaline earth metal salt. The liquid electrolyte may further include an ionic liquid, if desired.

The organic solvent may include a carbonate solvent. For examples, the organic solvent may be at least one selected from ethylene carbonate, propylene carbonate, dimethyl carbonate, diethyl carbonate, ethyl methyl carbonate, fluoroethylene carbonate, γ-butyrolactone, 1,2-dimethoxy ethane, diepoxy ethane, dimethylene glycol dimethyl ether, trimethylene glycol dimethyl ether, tetraethylene glycol dimethyl ether, polyethylene glycol dimethyl ether, succinonitrile, sulfolane, dimethyl sulfone, ethylmethyl sulfone, diethyl sulfone, adiponitrile, 1,1,2,2-tetrafluoroethyl 2,2,3,3-tetrafluoropropyl ether, and tetraphenylethylene 2,2,2-trifluoroethanol.

Descriptions for the alkali metal salt and the alkaline earth metal salt may be the same as defined in connection with the alkali metal salt and the alkaline earth metal salt described above, and thus will not be repeated.

The term "ionic liquid" refers to a salt in a liquid state at room temperature or a room temperature molten salt having a melting point of room temperature or less and consisting of ions. The ionic liquid may be a compound including:

i) at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazole cation, and a mixture thereof; and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, and $(C_2F_5SO_2)(CF_3SO_2)N^-$.

For example, the ionic liquid may be at least one selected from N-methyl-N-propyl pyrrolidinium bis(trifluoromethanesulfonyl)imide, N-butyl-N-methyl pyrrolidinium bis(3-trifluoromethylsulfonyl)imide, 1-butyl-3-methylimidazolium bis(trifluoromethylsulfonyl)amide, and 1-ethyl-3-methylimidazolium bis(trifluoromethylsulfonyl)amide.

In some embodiments, when an electrolyte includes the ionic liquid and a lithium salt, a mole ratio of the ionic liquid (IL) to lithium ions (Li) (IL/Li) may be in a range of about 0.1 to about 2.0, for example, from about 0.2 to about 1.8, for example, from about 0.4 to about 1.5. While not wishing to be bound by theory, it is understood that an electrolyte having such a mole ratio may have excellent lithium ion mobility and ion conductivity, thus more effectively suppressing growth of lithium dendrite on a surface of a negative electrode.

The solid electrolyte may be an organic solid electrolyte or an inorganic solid electrolyte.

Examples of the organic solid electrolyte may include a polyethylene derivative, a polyethylene oxide derivative, a polypropylene oxide derivative, a phosphate ester polymer, a polyagitation lysine, a polyester sulfide, a polyvinyl alcohol, a polyvinylidene fluoride, and a polymer including an ionic dissociation group.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ ($0.1 \leq x \leq 0.9$), $Li_{1+x}Hf_{2-x}Al_x(PO_4)_3$ ($0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein M may be a rare earth element, such as Nd, Gd, or Dy) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0 \leq x \leq 0.8$, $0 \leq y \leq 1.0$, and M may be Nd, Sm, Eu, Gd, Tb, Dy, Ho, Er, Tm, or Yb), $Li_{1+x+y}Q_xTi_{2-x}Si_yP_{3-y}O_{12}$ (wherein $0 \leq x \leq 0.4$, $0 \leq y \leq 0.6$, and Q may be Al or Ga), $Li_6BaLa_2Ta_2O_{12}$, $Li_7La_3Zr_2O_{12}$, $Li_5La_3Nb_2O_{12}$, $Li_5La_3M_2O_{12}$ (M may be Nb or Ta), and $Li_{7+x}A_xLa_{3-x}Zr_2O_{12}$ (wherein $0<x\leq3$, and A may be Zn).

The gel electrolyte may be any suitable electrolyte in gel-typed known in the art. The gel electrolyte may include, for example, a polymer and an ionic liquid polymer. The polymer may be, for example, a solid graft (block) copolymer electrolyte.

The inorganic particle may include at least one selected from a metal hydroxide, a metal carbonate, a metal carboxylate, a metal silicate, a metal aluminosilicate, a metal carbide, a metal nitride, a metal halide, a metal nitrate, a carbon oxide, a carbonaceous material, and an organic-inorganic composite. Examples of the inorganic particles may include $SiO_2$, $TiO_2$, $ZnO$, $Al_2O_3$, $BaTiO_3$, graphite oxide, graphene oxide, cage-structured silsesquioxane, $Li_2CO_3$, $Li_3PO_4$, $Li_3N$, $Li_3S_4$, $Li_2O$, montmorillonite, and a metal-organic framework (MOF). The average diameter of the inorganic particles may be in 1 micrometers (μm) or less, for example 500 nanometers (nm) or less, for example, 100 nm or less. In some embodiments, the average diameter of the inorganic particles may be in a range of about 1 nm to about 100 nm. In some embodiments, the average diameter of the inorganic particles may be in a range of about 5 nm to about 100 nm. In some embodiments, the average diameter of the inorganic particles may be in a range of about 10 nm to about 100 nm. In some embodiments, the average diameter of the inorganic particles may be in a range of about 10 nm to about 70 nm. In some embodiments, the average diameter of the inorganic particles may be in a range of about 30 nm to about 70 nm. When the average diameter of the inorganic particles is within these ranges, an electrolyte having excellent film forming properties and mechanical properties may be prepared without decrease of ion conductivity thereof.

The inorganic particles may have various shapes. For example, the inorganic particle may have a spherical shape, an elliptical shape, a cubical shape, a tetrahedral shape, a pyramidal shape, an octahedral shape, a cylindrical shape, a polygonal pillar-like shape, a conical shape, a columnar shape, a tubular shape, a helical shape, a funnel shape, a dendritic shape, or any of various common regular and irregular shapes.

Examples of the separator may include polyethylene, polypropylene, polyvinylidene fluoride, and a multilayer film of two or more layers thereof, such as a mixture multilayer film, such as a polyethylene/polypropylene two layered separator, a polyethylene/polypropylene/polyethylene three-layered separator, and a polypropylene/polyethylene/polypropylene three-layered separator. To the separator, an alkali metal salt and an alkaline earth metal salt, for example, an electrolyte including a lithium salt and an organic solvent may be added.

According to another aspect, a method of preparing an electrolyte for a secondary battery may include;

providing a monomer represented by Formula 3;

in-situ polymerizing the monomer represented by Formula 3 to obtain the electrolyte:

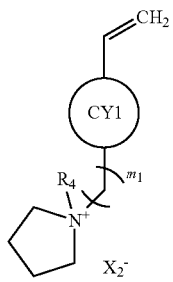

Formula 3 wherein, in Formula 3,

CY1 may be selected from a substituted or unsubstituted non-fused 6-membered aromatic ring, a substituted or unsubstituted fused $C_{10}$-$C_{30}$ 6-membered aromatic ring, or a combination of at least two of the foregoing aromatic rings linked through a single bond or a $C_1$-$C_{20}$ alkylene group;

$R_4$ may be selected from a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof;

$m_1$ may be an integer selected from 1 to 1,000; and $X_2^-$ may be at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

The "substituted or unsubstituted non-fused 6-membered aromatic ring", "substituted or unsubstituted fused $C_{10}$-$C_{30}$ 6-membered aromatic ring", "substituted or unsubstituted $C_1$-$C_{20}$ alkyl group", "substituted or unsubstituted $C_1$-$C_{20}$ alkoxy group", and "$C_2$-$C_{20}$ alkylene oxide group" used in Formula 3 may be the same as defined in Formula 1.

The in-situ polymerizing may include thermal in-situ polymerization or ultraviolet (UV) in-situ polymerization at room temperature. That is, a surface of the negative electrode may be directly coated with a solution containing the monomer for forming an ionic liquid polymer represented by Formula 3 to thermally polymerize or UV polymerize at room temperature, thereby obtaining an electrolyte including an ionic liquid polymer including a repeating unit represented by Formula 1. The solution containing the monomer for forming an ionic liquid polymer may be an organic solvent, water, or the solution containing the monomer for forming an ionic liquid polymer dissolved in a mixture solvent of the organic solvent and water. The organic solvent may be dichloroethane. The coating method may be doctor blade, spin coating, roll coating, casting or any suitable coating method known in the art.

The thermal polymerization may be carried out at a temperature in a range of about 40° C. to about 200° C. for about 10 minutes to about 24 hours. If desired, a cross-linking agent or a polymerization initiator may be further added thereto. The cross-linking agent may serve to improve mechanical properties of the ionic liquid polymer. The cross-linking agent is not particularly limited, and may be a bifunctional or polyfunctional acrylate compound. In some embodiments, ethylene glycol dimethacrylate may be used. The polymerization initiator is not particularly limited, but a peroxide polymerization initiator or an azo polymerization initiator may be used. In some embodiments, benzoyl peroxide, methyl ethyl peroxide, 2,2'-azobis(2-isobutyronitrile), 2,2'-azobis isobutyronitrile, or 2,2'-azobis(2,4-dimethyl valeronitrile) may be used.

The UV in-situ polymerization at room temperature may be carried out by directly coating a surface of a negative electrode with a solution containing the monomer for forming an ionic liquid polymer represented by Formula 3 and photopolymerization initiator, and drying the coated negative electrode at room temperature for about 10 minutes to about 24 hours. The photopolymerization initiator is not particularly limited, and a known photopolymerization initiator, such as a benzoin photopolymerization initiator, an acetophenone photopolymerization initiator, such as 2-hydroxy-2-methyl-1-phenyl-1-propanone, or a benzyl ketal photopolymerization initiator may be used. For example, 2-hydroxy-2-methyl-1-phenyl-1-propanone, acetophenone, benzophenone, or 4-methoxybenzophenone may be used alone or as a mixture thereof.

The electrolyte may include at least one selected from an alkali metal salt and an alkaline earth metal salt. The at least one selected from an alkali metal salt and an alkaline earth metal salt may include at least one selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$F)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(CF$_3$)$_3$, LiB(C$_2$O$_4$)$_2$, NaSCN, NaSO$_3$CF$_3$, KTFSI, NaTFSI, Ba(TFSI)$_2$, Pb(TFSI)$_2$, and Ca(TFSI)$_2$. For example, the alkali metal salt and the alkaline earth metal salt may be a lithium salt selected from LiClO$_4$, LiCF$_3$SO$_3$, LiBF$_4$, LiN(CF$_3$SO$_2$)$_2$, LiN(SO$_2$F)$_2$, LiPF$_6$, LiAsF$_6$, LiSbF$_6$, and LiPF$_3$(CF$_2$CF$_3$)$_3$.

The electrolyte including the alkali metal salt and the alkaline earth metal salt may have excellent lithium ion mobility and ion conductivity, and may effectively suppress growth of dendrite on the surface of a negative electrode.

The amount of the alkali metal salt and the alkaline earth metal salt may be in a range of about 0.01 part by weight to about 100 parts by weight based on 100 parts by weight of the monomer for forming the ionic liquid polymer, for example, about 10 parts by weight to about 100 parts by weight based on 100 parts by weight of the monomer for forming the ionic liquid polymer, for example, about 20 parts by weight to about 100 parts by weight based on 100 parts by weight of the monomer for forming the ionic liquid polymer. While not wishing to be bound by theory, it is understood that when an electrolyte includes the alkali metal salt and the alkaline earth metal salt within these ranges, a secondary battery including the electrolyte may have improved electrochemical stability and charging and discharging characteristics.

A secondary battery according to another aspect of the present inventive concept may include:

a positive electrode;

a negative electrode; and an electrolyte disposed between the positive electrode and the negative electrode. The secondary battery may be a lithium secondary battery. The lithium secondary battery may be, for example, a lithium air battery, a lithium metal battery, a lithium ion battery, a lithium sulfur battery, or a lithium polymer battery.

FIGS. 3A to 3D each illustrates a schematic cross-sectional view of a lithium secondary battery according to an exemplary embodiment.

Figure 3A:
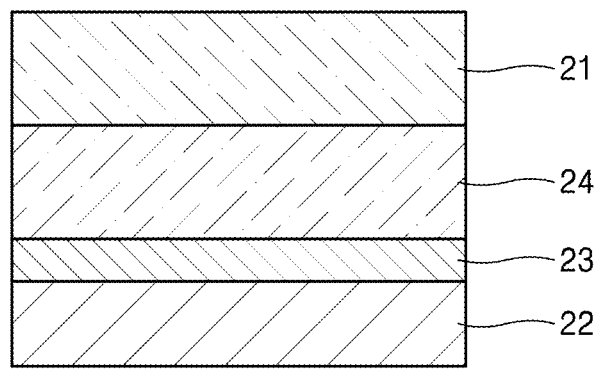
FIGS. 3A to 3D each illustrates a schematic cross-sectional view of a lithium secondary battery according to an exemplary embodiment.

As shown in FIG. 3A, a lithium secondary battery may include a positive electrode 21, a negative electrode 22, and an electrolyte 23 disposed therebetween. An intermediate layer 24 may be further included between the electrolyte 23 and the positive electrode 21. The intermediate layer 24 may have different composition from the electrolyte 23. The intermediate layer 24 may further include at least one selected from a liquid electrolyte, a solid electrolyte, a gel electrolyte, and a separator.

The positive electrode 21 may be prepared by coating a positive active material composition including a positive active material, a conducting agent, a binder, and a solvent, and then drying the coated electrode.

Examples of the negative electrode 22 may include a lithium metal and a lithium metal alloy electrode. The negative electrode 22 may be, for example, a lithium metal thin film. The thickness of the lithium metal thin film may be 100 μm or less. For example, the lithium secondary battery may have stable cycle characteristics even when using a lithium metal thin film having a thickness of about 100 μm or less. For example, in the lithium secondary battery, the thickness of the lithium metal thin film may be 80 μm or less, for example, 60 μm or less. In an embodiment, the thickness of the lithium metal thin film may be in a range of about 0.1 μm to about 60 μm.

The negative electrode may be a lithium metal electrode or a lithium metal alloy electrode, and the electrolyte may be disposed on at least one portion of the negative electrode as a layer, a film, or a sheet.

As the electrolyte 23 is disposed on at least one portion of the negative electrode 22 as a layer, a film, or a sheet, the surface of the negative electrode may be mechanically and electrochemically stable. Accordingly, growth of dendrite on a surface of the negative electrode 22 may be suppressed during charging and discharging of the lithium secondary battery, and interfacial stability between the negative electrode 22 and the electrolyte 23 may improve. Therefore, the lithium secondary battery may have improved discharging capacity, coulomb efficiency, and lifespan characteristics.

The thickness of the layer, the film, or the sheet may be in a range of about 0.1 μm to about 100 μm, for example, about 0.1 μm to about 10 μm. When an electrolyte has a thickness within these ranges, the electrolyte may have excellent mechanical properties and ion conductivity. Accordingly, a lithium secondary battery including the electrolyte may have improved electrochemical stability, such as capacity, coulomb efficiency, and lifespan characteristics.

As the surface of the negative electrode 22 is fully coated with the electrolyte 23, the electrolyte 23 may serve as a protective film that protects the surface of the negative electrode 22. For example, a direct contact between a surface of the negative electrode 22, which is disposed between the electrolyte 23 and the positive electrode 21, and the electrolyte 23, which is highly reactive towards lithium, may be prevented. Therefore, the negative electrode 22 may be protected, thereby increasing the electrochemical stability of the negative electrode 22.

Figure 3B:
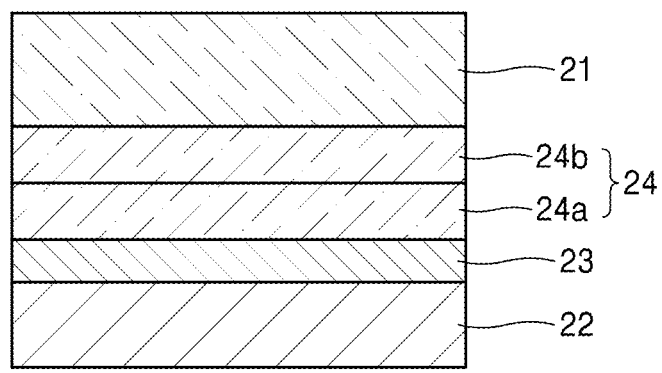

As shown in FIG. 3B, the intermediate layer 24 may have a two-layered structure, in which a liquid electrolyte 24a and a solid electrolyte 24b are sequentially stacked. In this case, the liquid electrolyte 24a may be adjacent to the electrolyte 23. Such a lithium secondary battery may have a stacking order of negative electrode/electrolyte/intermediate layer (liquid electrolyte/solid electrolyte)/positive electrode.

Figure 3C:
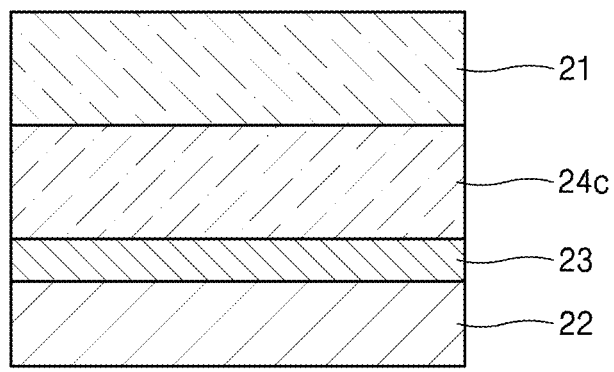

Referring to FIG. 3C, the lithium secondary battery according to an exemplary embodiment may include a separator 24c as an intermediate layer. Descriptions for the separator will not be repeated here, as the separator has already been described above.

Figure 3D:
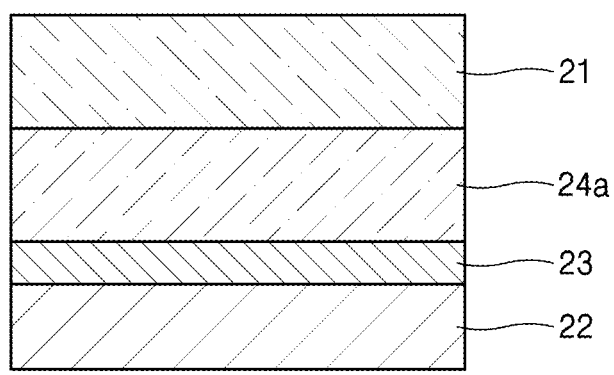

As shown in FIG. 3D, as an intermediate layer of a lithium secondary battery according to an embodiment, a liquid electrolyte 24a may be used. The liquid electrolyte may have the same or different composition with the liquid electrolyte included in the electrolyte 23.

The secondary battery, for example, a lithium secondary battery may have an operation potential in a range of about −0.1 V to about 4.5 V. In particular, the secondary battery, for example, the lithium secondary battery may be used even at a high voltage of 3.5 V or greater, for example, a voltage in a range of about 3.8 V to about 4.5 V or greater.

Regarding the negative electrode 22, an interfacial resistance ($R_i$) between a lithium metal member and the protective film in a Nyquist plot obtained from impedance measurements is about 40% or greater less than that of a bare lithium metal at a temperature of about 25° C. When the electrolyte is used as a protective film for a lithium metal electrode or a lithium metal alloy electrode, an interfacial resistance is reduced compared to a battery having a lithium metal electrode alone. Accordingly, the battery using the electrolyte as a protective film may have excellent electrochemical stability.

Figure 4:
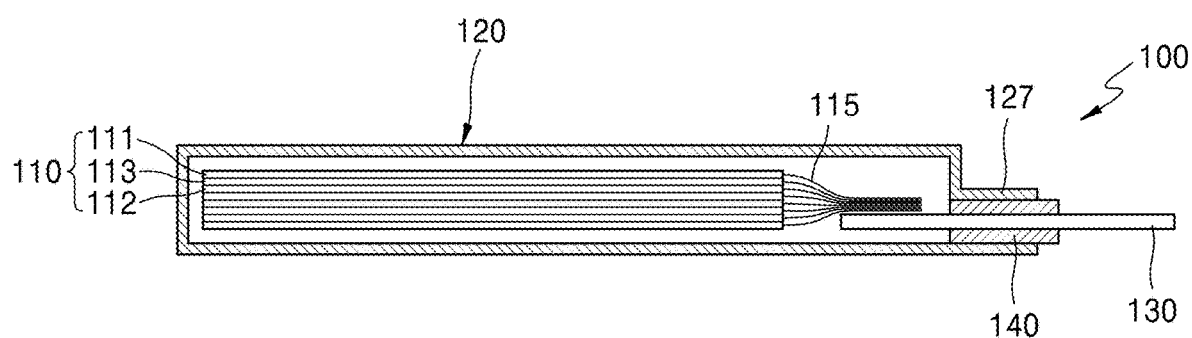
FIG. 4 illustrates a schematic cross-sectional view of a pouch-typed lithium secondary battery according to an embodiment.

FIG. 4 illustrates a schematic cross-sectional view of a pouch-typed lithium secondary battery 100.

Referring to FIG. 4, the pouch-typed lithium secondary battery 100 may include an electrode assembly 110, a lead tap 130, and an exterior member 120 including a portion for injecting an electrolyte. The pouch-typed lithium secondary battery 100 according to an exemplary embodiment is a secondary battery, which is rechargeable, for example, a lithium-ion battery.

The electrode assembly 110 may be accommodated in the exterior member 120. The electrode assembly 110 may include a positive electrode plate 111, a negative electrode plate 112, and a separator 113 disposed between the positive electrode plate 111 and the negative electrode plate 112. The electrode assembly 110 may be a stacked electrode assembly, in which the positive electrode plate 111, the separator 113, and the negative electrode plate 112 are sequentially stacked. To provide the pouch-typed lithium secondary battery 100 having a high power output and large capacity, a plurality of the positive electrode plates 111, the separators 113, and the negative electrode plates 112 may be stacked.

The positive electrode plate 111 may be formed by coating a surface of a positive electrode current collector including a material, such as aluminum, with a positive active material.

The positive active material may include at least one selected from lithium cobalt oxide, lithium nickel cobalt manganese oxide, lithium nickel cobalt aluminum oxide, lithium iron phosphorous oxide, and lithium manganese oxide, but embodiments are not limited thereto. Any suitable positive active material available in the art may be used.

For example, the positive active material may be a compound represented by one of the following formulae: $Li_aA_{1-b}B'_bD'_2$ (wherein $0.90 \le a \le 1.8$, and $0 \le b \le 0.5$); $Li_aE_{1-b}B'_bO_{2-c}D'_c$ (wherein $0.90 \le a \le 1.8$, $0 \le b \le 0.5$, and $5 \le c \le 0.05$); $LiE_{2-b}B'_bO_{4-c}D'_c$ (wherein $0 \le b \le 0.5$, and $0 \le c \le 0.05$); $Li_aNi_{1-b-c}Co_bB'_cD'_\alpha$ (wherein $0.90 \le a \le 1.8$, $0 \le b \le 0.5$, $0 \le c \le 0.05$, and $0 \le \alpha \le 2$); $Li_aNi_{1-b-c}Co_bB'_cO_{2-\alpha}F'_\alpha$ (wherein $0.90 \le a \le 1.8$, $0 \le b \le 0.5$, $0 \le c \le 0.05$, and $0 \le \alpha \le 2$); $Li_aNi_{1-b-c}Mn_bB'_cD'_\alpha$ (wherein $0.90 \le a \le 1.8$, $0 \le b \le 0.5$, $0 \le c \le 0.05$, and $0 \le \alpha \le 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 \le \alpha \le 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dG_eO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$, and $0.001 \le b \le 0.1$); $Li_aCoG_bO_2$ (wherein $0.90 \le a \le 1.8$, and $0.001 \le b \le 0.1$); $Li_aMnG_bO_2$ (wherein $0.90 \le a \le 1.8$, and $0.001 \le b \le 0.1$); $Li_aMn_2GbO_4$ (wherein $0.90 \le a \le 1.8$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The positive electrode active material, a binder, and a solvent may be mixed to prepare a positive active material composition.

A conducting agent may be further added to the positive active material composition.

The positive active material layer composition may be directly coated on a metallic current collector and dried to form a positive electrode. Alternatively, the positive active material layer composition may be cast on a support to form a positive active material layer, which may then be separated from the support and laminated on a metallic current collector to form a positive electrode.

The current collector may be a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it can be easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The conducting agent, the binder, and the solvent in the positive active material composition may be the same as those used in the negative active material composition. A plasticizer may further be added to the positive active material composition and/or the negative active material composition to form pores inside the electrode plates.

The amounts of the positive active material, the conductive agent, the binder, and the solvent used in the manufacture of the lithium battery are those levels that are generally used in the art. At least one of the conducting agent, the binder, and the solvent may not be used depending on the use and the structure of the lithium secondary battery.

The negative electrode plate 112 may be formed by coating a surface of a negative electrode current collector including a material, such as nickel, with a negative active material. For a negative active material, a metal or metalloid alloyable with lithium, an alloy thereof, or an oxide thereof. For example, the metal or metalloid alloyable with lithium may be Si, Sn, Al, Ge, Pb, Bi, SbSi—Y' alloy (wherein Y' may be an alkali metal, an alkaline earth metal, Group 13 elements, Group 14 elements, a transition metal, a rare earth element or a combination thereof, except for Si), Sn—Y' alloy (wherein Y' may be an alkali metal, an alkaline earth metal, Group 13 elements, Group 14 elements, a transition metal, a rare earth element or a combination thereof, except for Sn), or $MnO_x$ (wherein $0<x \le 2$). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof. For example, an oxide of the metal or metalloid alloyable with lithium may be a lithium titanium oxide, a vanadium oxide, a lithium vanadium oxide, $SnO_2$, or $SiO_x (0<x<2)$.

In some embodiments, for the negative electrode, a lithium metal thin film or a metal thin film containing lithium may be used.

The amounts of the negative active material, the conductive agent, the binder, and the solvent used in the manufacture of the lithium secondary battery are the levels that are generally used in the art.

For an electrolyte, the electrolyte according to an exemplary embodiment may be used. The electrolyte may be disposed between the positive electrode plate 111 and the negative electrode plate 112. The electrolyte may be on the negative electrode plate 112 as an electrolyte protective film.

The separator 113 that is generally used in a lithium secondary battery may be included other than the electrolyte.

The separator 113 may be an insulating thin film having a high ion permeability and mechanical strength. The diameter of the separator 113 may be in a range of about 0.01 μm to about 10 μm, and the thickness of the separator 113 may be in a range of about 5 μm to about 20 μm. Examples of the separator 113 may include an olefin polymer, such as polypropylene and a sheet or a non-woven fabric including glass fiber or polyethylene. As an electrolyte, when a solid polymer electrolyte, such as a solid polymer, is used, the solid electrolyte may also serve as a separator.

Detailed examples of the separator 113 may include polyethylene, polypropylene, polyvinylidene fluoride, and a multilayer film of two or more layers thereof, such as a mixture multilayer film, such as a polyethylene/polypropylene two layered separator, a polyethylene/polypropylene/polyethylene three-layered separator, and a polypropylene/polyethylene/polypropylene three-layered separator.

The secondary battery according to an exemplary embodiment may have excellent capacity and lifespan characteristics. Thus, the secondary battery 10' may be used not only in a battery cell utilized as a power in small-sized devices, but also in a battery pack including a plurality of battery cells or a unit battery of a battery module as a power in medium- or large-sized devices.

Examples of the medium- or large-sized devices may include electric cars, such as electric vehicles (EV), hybrid electric vehicles (HEV), plug-in hybrid electric vehicles (PHEV), electric two-wheeled vehicles, such as E-bikes and E-scooters, power tools, and power storage systems. However, embodiments are not limited thereto.

In addition, an electrode tab 115 may be connected to each of the positive electrode plate 111 and the negative electrode plate 112. Electrode tabs 115 drawn from the positive electrode plate 111 and the negative electrode plate 112, which are stacked on each other, overlap each other, and the dense electrode tabs 115 are electrically connected to a lead tap 130. For example, the electrode tab 115 and the lead tap 130 may be connected using ultrasonic welding, etc.

The lead tap 130 may extend outside from the top of the exterior member 120 and be surrounded by a tab tape 140 to increase the sealing performance of the lead tap 130 with respect to the exterior member 120 and to electrically insulate the lead tap 130 from the exterior member 120.

In the pouch-typed lithium secondary battery according to an exemplary embodiment, it is described that the electrode assembly 110 is stacked-typed, but embodiments are not limited thereto. For example, the electrode assembly 110 may be a jelly-roll type electrode assembly manufactured by stacking a positive electrode plate, a separator, and a negative electrode plate and winding the stacked structure.

The exterior member 120 may have a pouch-type and include an internal space for accommodating the electrode assembly 110 and an electrolyte solution. For example, the outer surface exposed to the outside and the inner surface accommodating the electrode assembly 110 of the exterior member 120 may include a thin metal film serving as an insulating layer. For example, the exterior member 120 may include a material, such as aluminum or stainless steel.

The exterior member 120 may include a portion for injecting an electrolyte protruding from a side of the exterior member 120.

Hereinafter, Examples and Comparative Examples will be described in detail. However, the present examples are for illustrative purpose only, and are not intended to limit the scope of the inventive concept.

EXAMPLE

Example 1

Preparation of Electrolyte

After removing impurities such as oxygen and moisture from a reactor, 10 grams (g) of Starting Material (1) of Reaction Scheme 1 (1-chloromethyl-4-vinylbenzene, available from Oakwood Chemical Co., Ltd.), was added to the reactor. 6.13 g of n-methylpyrrolidine (97%, available from Sigma-Aldrich Co., Ltd) dissolved in 100 milliliters (ml) of dichloroethane was subsequently added thereto and the mixture was stirred at a temperature of about 70° C. for about 9 hours to obtain an Intermediate Product (2) of Reaction Scheme 1. An aqueous lithium bis(trifluoromethylsulfonyl)imide (LiTFSI, available from PANAX Co., Ltd) solution was added to the Intermediate Product (2) at a mole ratio of about 1:1.2, and the resulting mixture was stirred at room temperature for about 6 hours to obtain a Monomer for Forming an Ionic Liquid Polymer (3) composition of Reaction Scheme 1, in which Cl⁻ anion was substituted with TFSI⁻ anion. To the electrolyte composition of Monomer for Forming an Ionic Liquid Polymer (3) about 3 mole percent (mol %) of 2-hydroxy-2-methyl-1-phenyl-1-propanone (HMPP) was added, based on the amount of the Monomer for Forming an Ionic Liquid Polymer (3), and the resulting mixture was coated on a Teflon support substrate by using a doctor blade. UV in-situ polymerization was performed thereon at a temperature of about 25° C. for about 30 minutes to obtain a layer typed electrolyte (thickness: about 5 micrometers (μm)) of an Ionic Liquid Polymer (4) (wherein n=250), which was the final product of Reaction Scheme 1.

Example 2

Preparation of Electrolyte

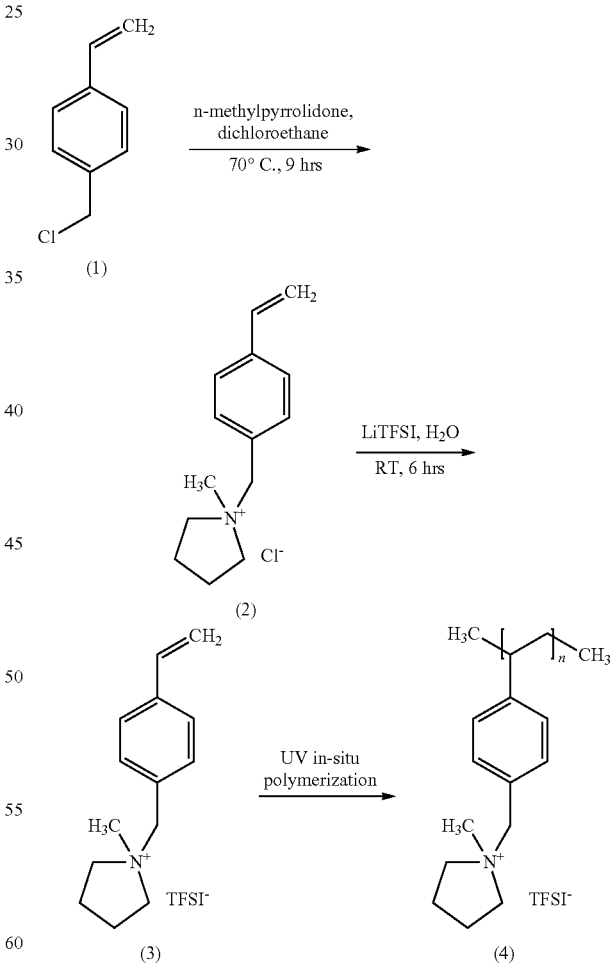

Reaction Scheme 1

A layer typed electrolyte (thickness: about 5 μm) was prepared in the same manner as in Example 1, except that lithium bis(trifluoromethylsulfonyl)imide (LiTFSI, available from PANAX Co., Ltd) was further added to the electrolyte composition of Monomer for Forming an Ionic Liquid Polymer (3), and the resulting mixture was stirred to obtain an electrolyte composition. The amount of the further added LiTFSI was about 25 parts by weight based on 100 parts by weight of the Monomer for Forming an Ionic Liquid Polymer (3).

Example 3

Preparation of Electrolyte

A layer typed electrolyte (thickness: about 5 μm) was prepared in the same manner as in Example 1, except that LiTFSI was further added to the electrolyte composition of Monomer for Forming an Ionic Liquid Polymer (3), and the resulting mixture was stirred to obtain an electrolyte composition. The amount of the further added LiTFSI was about 100 parts by weight based on 100 parts by weight of the Monomer for Forming a Ionic Liquid Polymer (3).

Example 4

Preparation of Lithium Secondary Battery
(Coin-Cell)

The electrolyte composition prepared in Example 1 was coated on a lithium metal member (thickness: about 25 μm) by using a doctor blade. UV in-situ polymerization was performed thereon at a temperature of about 25° C. for about 30 minutes to thereby prepare a lithium negative electrode (thickness: about 35 μm) having an electrolyte (formed negative electrode protective film) having a thickness of about 5 μm.

In a separate vessel, $LiCoO_2$, a conducting agent (Super-P; available from Timcal, Ltd.), polyvinylidene fluoride (PVdF), and N-pyrrolidone were mixed together to obtain a positive electrode composition. In the positive electrode composition, a mixture weight ratio of $LiCoO_2$ to the conducting agent, and PVDF was about 97:1.5:1.5.

The positive electrode composition was coated on an aluminum foil (thickness: about 15 μm) and dried, first—at 25° C., and then—at about 110° C. in a vacuum atmosphere, thereby preparing a positive electrode.

An electrolyte was disposed between the positive electrode obtained according to the above procedure and lithium metal negative electrode to thereby prepare a lithium secondary battery (coin-cell). A polyethylene/polypropylene separator was disposed between the positive electrode and the electrolyte, and a liquid electrolyte was added thereto. The liquid electrolyte was obtained by adding a lithium salt dissolving 1.0 molar (M) LiTFSI to a mixture solvent of dimethoxy ethane and 1,1,2,2-tetrafluoroethyl-2,2,3,3-tetrafluoropropyl ether at a volume ratio of about 2:8.

Example 5

Preparation of Lithium Secondary Battery
(Coin-Cell)

A lithium secondary battery (coin-cell) was prepared in the same manner as in Example 4, except that the electrolyte composition prepared in Example 2 was used instead of the electrolyte composition prepared in Example 1.

Example 6

Preparation of Lithium Secondary Battery
(Coin-Cell)

A lithium secondary battery (coin-cell) was prepared in the same manner as in Example 4, except that the electrolyte composition prepared in Example 3 was used instead of the electrolyte composition prepared in Example 1.

Comparative Example 1

Preparation of Lithium Secondary Battery
(Coin-Cell)

A lithium secondary battery (coin-cell) was prepared in the same manner as in Example 5, except that for a negative electrode, a lithium metal member (thickness: about 20 μm) on a copper current collector (thickness: about 10 μm) was used.

Analysis Example 1

$^1$H-NMR Analysis and MALDI-TOF Analysis 1-1. $^1$H-NMR Analysis

In order to analyze the electrolyte composition of Monomer for Forming an Ionic Liquid Polymer (3) used in Example 1, the following synthesis method was used to perform $^1$H-NMR analysis thereon.

The synthesis method of the electrolyte composition of a Monomer for Forming an Ionic Liquid Polymer (3) is as follows.

First, 4-vinylbenzene, n-methylpyrrolidine, and methyl chloride were subjected to N-methyl alkylation to obtain the Intermediate product (2) of Reaction Scheme 1. Then, an aqueous LiTFSI (available from PANAX Co., Ltd) solution was added at a predetermined molar ratio to substitute Cl$^-$ anions with TFSI$^-$ anions, thereby synthesizing the electrolyte composition of Monomer for Forming an Ionic Liquid Polymer (3).

NMR 600 MHz (Model No: AVANCE III, available from Bruker Co., Ltd) was used to perform $^1$H-NMR analysis. The result of the $^1$H-NMR analysis is shown in FIGS. 1A to 1D, in which FIG. 1C is an enlarged view of a portion of FIG. 1A, and FIG. 1D is an enlarged view of a portion of 1B.

Figure 1B:
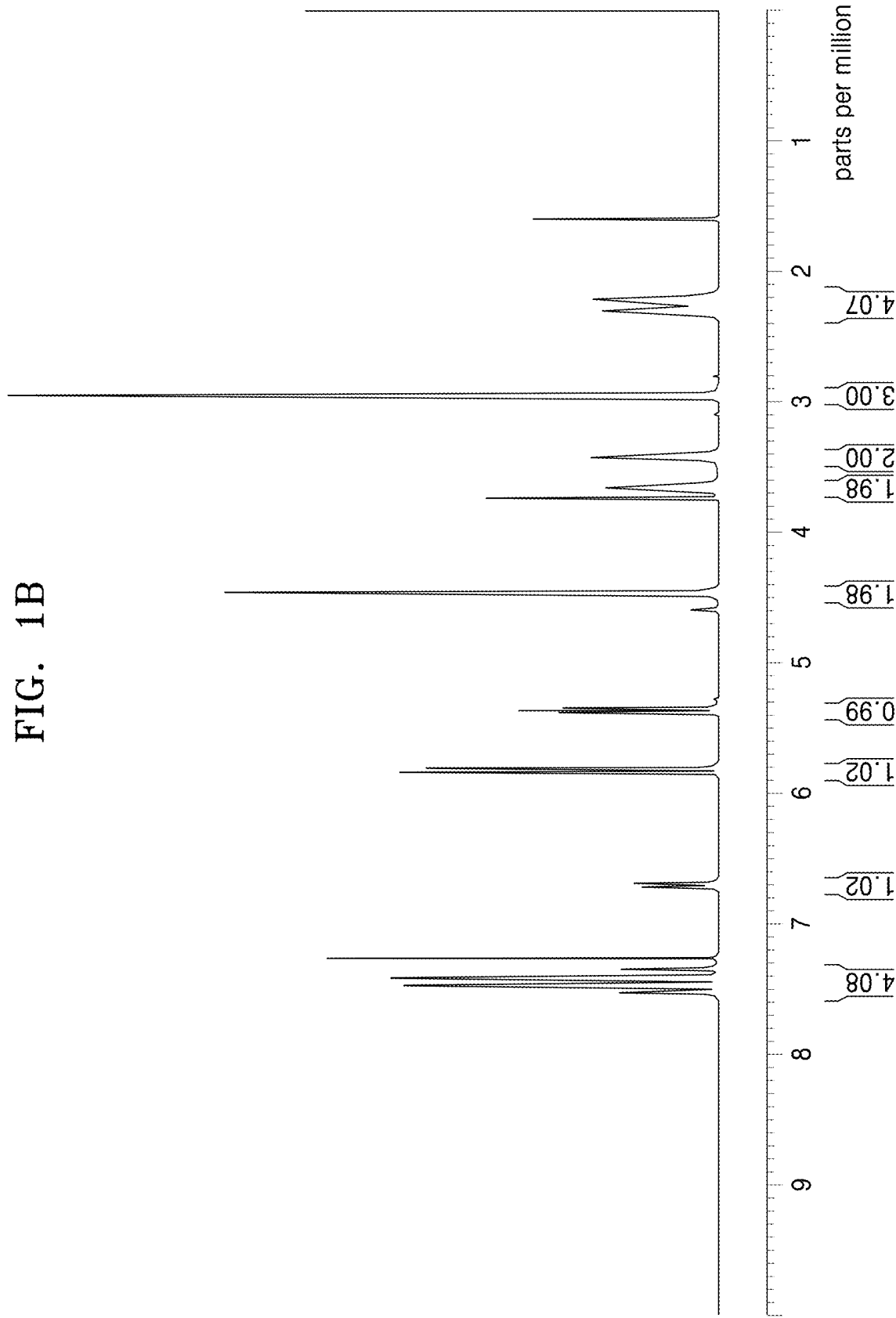
Figure 1C:
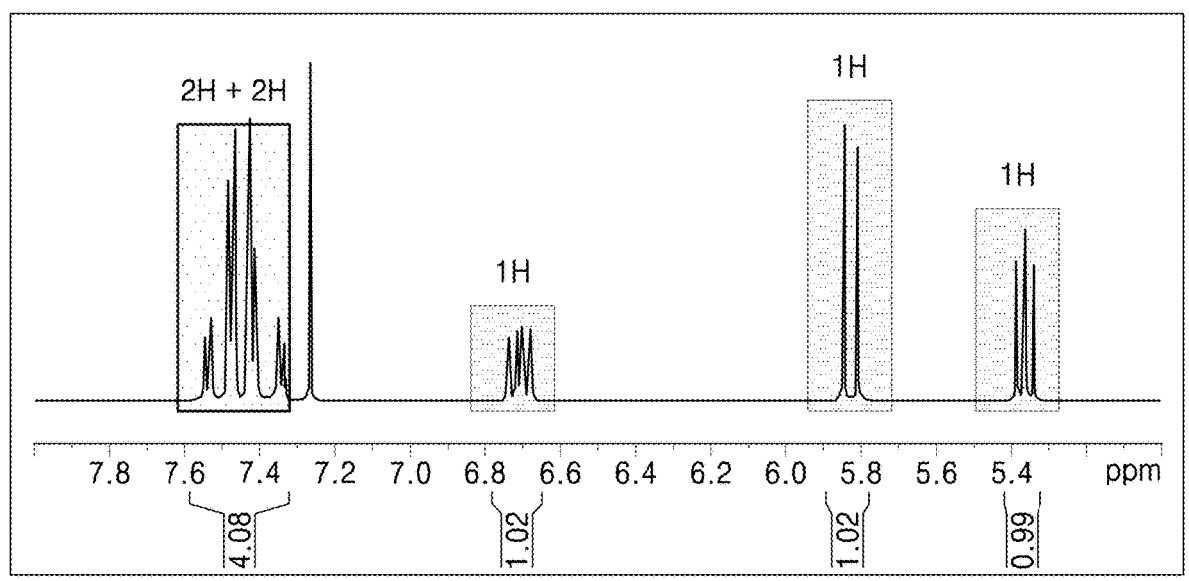
FIGS. 1C and 1D are graphs of signal intensity (arbitrary units, a. u.) versus chemical shift (parts per million, ppm) showing an enlarged view of portions of FIGS. 1A and 1B, respectively.
Figure 1D:
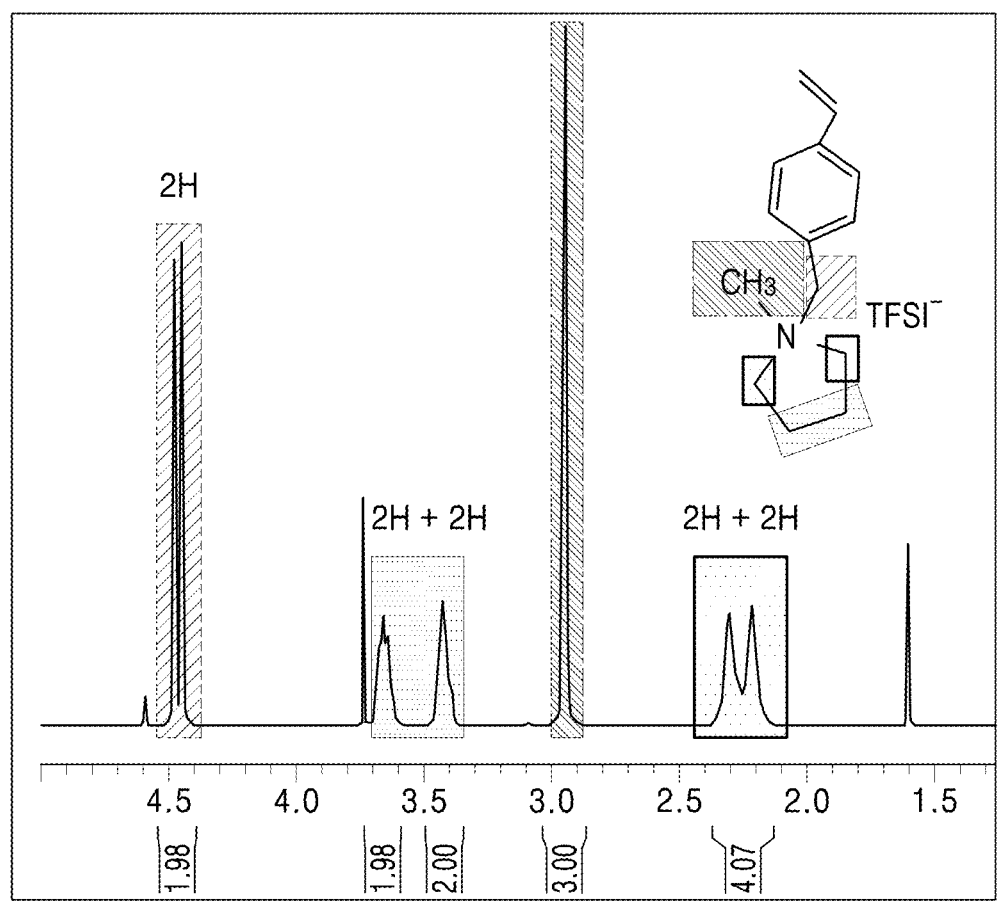

Referring to FIGS. 1A and 1B, distinguishing peaks of the electrolyte composition of a Monomer for Forming an Ionic Liquid Polymer (3) of Reaction Scheme 1 were found. That is, a C=C bond derived from a vinyl group, a H—C=C bond derived from a benzene ring, a $CH_3$ group derived from a methyl group, and a $CH_2$ bond derived from a pyrrolidinium cation were identified. Thus, the presence of the synthesized electrolyte composition of the Monomer for Forming an Ionic Liquid Polymer (3) of Reaction Scheme 1 was verified.

1-2. MALDI-TOF Analysis

In order to analyze the electrolyte composition of Monomer for Forming an Ionic Liquid Polymer (3) used in Example 1, the synthesis method used in the previous section (1.1 $^1$H-NMR analysis) was used to perform matrix assisted laser desorption and ionization-time of flight (MALDI-TOF) analysis.

Ultraflex III TOF/TOF 200 (available from Bruker Co., Ltd) was used in MALDI-TOF analysis. The results of MALDI-TOF analysis are shown in FIGS. 2A and 2B.

Figure 2A:
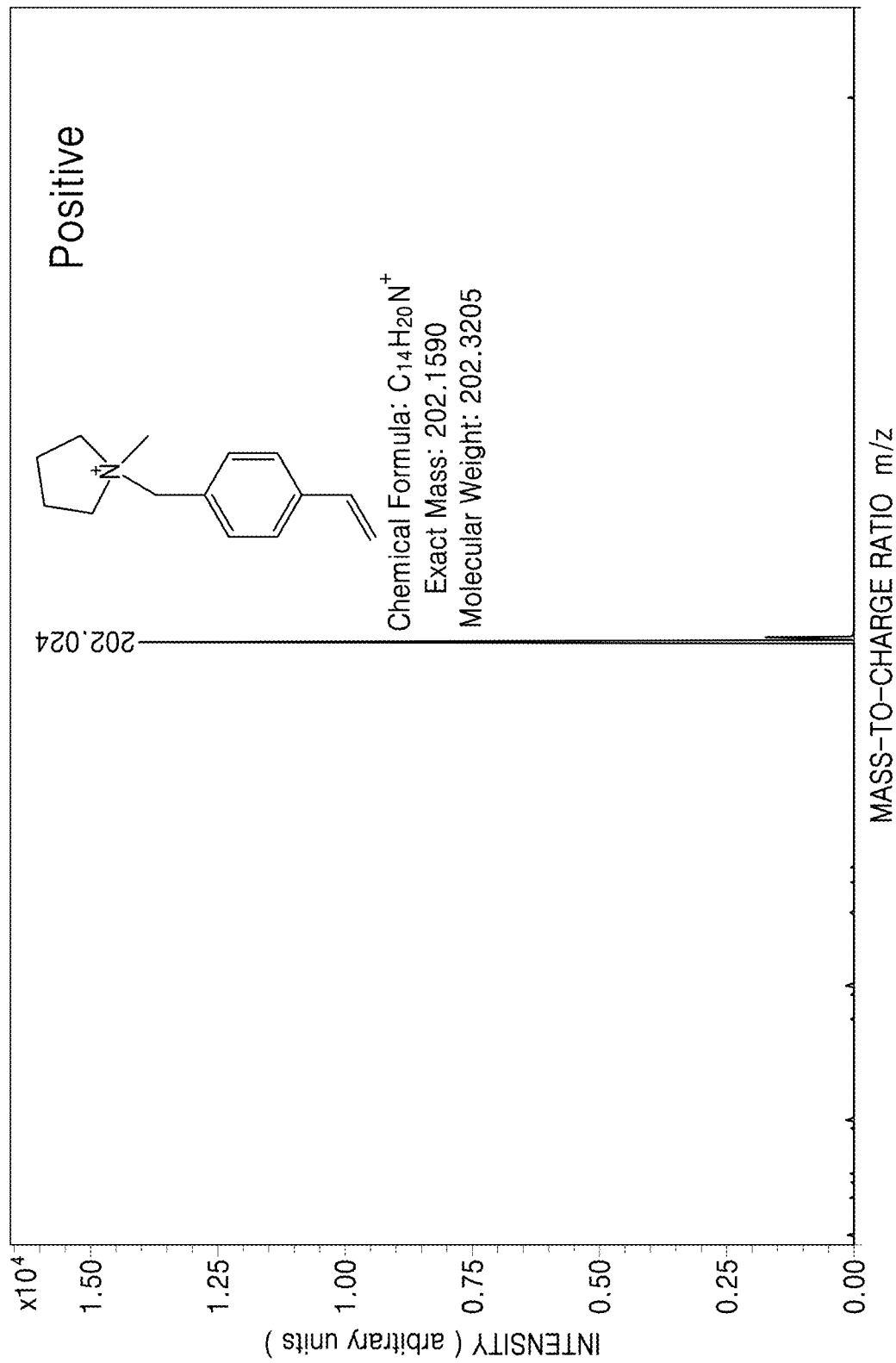
FIGS. 2A and 2B are graphs of signal intensity (arbitrary units, a. u.) versus molecular ion mass to charge ratio (m/z) (grams per mole, g/mol) showing results of matrix assisted laser desorption and ionization-time of flight (MALDI-TOF) analysis of the electrolyte composition of the monomer for forming an ionic liquid polymer used in Example 1.
Figure 2B:
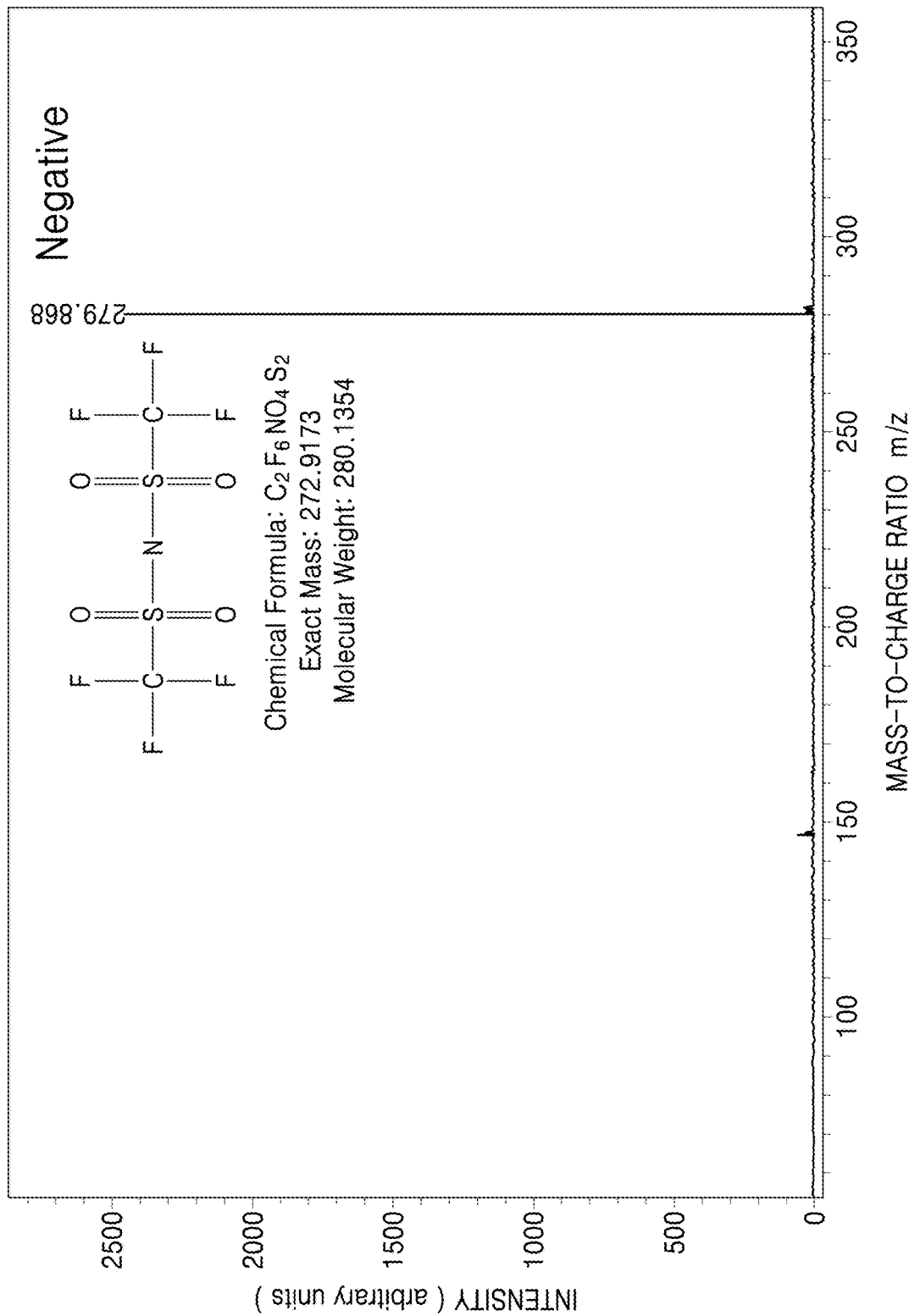

Referring to FIGS. 2A and 2B, in the electrolyte composition of Monomer for Forming an Ionic Liquid Polymer (3) of Reaction Scheme 1, the presence of 1-methyl-1-vinylbenzyl-pyrrolidinium cation and bis(trifluoromethylsulfonyl)amide anion was found by molecular weight analysis.

Analysis Example 2

Scanning Electron Microscope (SEM) Image

The surface of a lithium negative electrode having an electrolyte (formed the negative electrode protective film) used in Example 4 and Comparative Example 1 was observed by using SEM. In SEM analysis, S-5500 (available from Hitachi Co., Ltd, resolution 0.4 nanometers (nm), driven at a voltage of about 30 kilo Volts (kV)) was used. The results thereof are shown in FIGS. 5A and 5B.

Figure 5A:
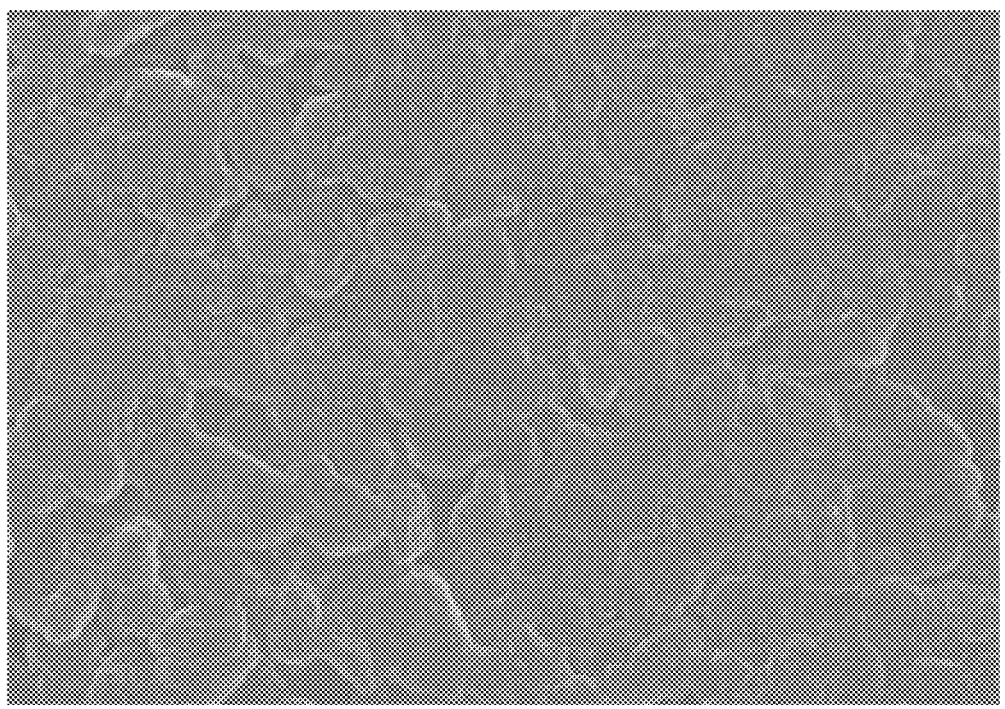
FIGS. 5A and 5B are scanning electron microscope (SEM) images of lithium negative electrodes having an electrolyte (formed negative electrode protective film) used in Example 4 and Comparative Example 1.
Figure 5B:
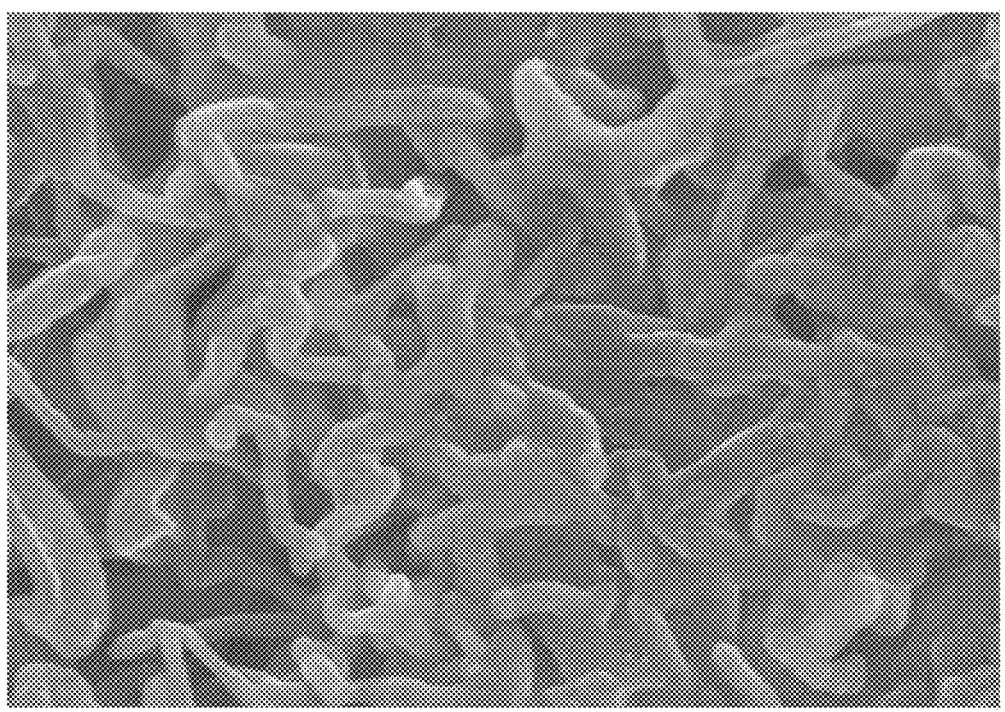

Referring to FIGS. 5A and 5B, it was found that growth of dendrite on the surface of the lithium negative electrode having an electrolyte (formed negative electrode protective film) used in Example 4 as shown in FIG. 5A was significantly reduced compared to the growth of dendrite on the surface of the lithium negative electrode having an electrolyte (formed negative electrode protective film) used in Comparative Example 1 as shown in FIG. 5B.

In addition, in order to measure a deposition density of lithium ions deposited on the surface of the lithium negative electrodes having an electrolyte (formed negative electrode protective film) used in Example 4 and Comparative Example 1, a method using the mass of the deposited lithium ions measured through the amount of electrons used in an electrochemical reaction and the volume of the deposited lithium ions measured through the thickness thereof was used. The results thereof are shown in Table 1.

TABLE 1

| Classification | Lithium deposition density (g/cm$^3$) |
|---|---|
| Example 4 | 0.19 |
| Comparative Example 1 | 0.13 |

Referring to Table 1, it was found that the deposition density of the lithium ions deposited on the surface of the lithium negative electrode having an electrolyte (formed negative electrode protective film) used in Example 4 was about 48% higher than the deposition density of the lithium ions deposited on the surface of the lithium negative electrode having an electrolyte (formed negative electrode protective film) used in Comparative Example 1. This is because the lithium negative electrode of Example 4 had the electrolyte (formed negative electrode protective film) on the top surface thereof.

Evaluation Example 1

Cyclic Voltammetry (CV) Evaluation

CV analysis was performed on the electrolyte of the Ionic Liquid Polymer (4) (n=250) prepared in Example 1. The results thereof are shown in FIG. 6.

For a CV analyzer, a potentiometer (electrochemical interface (1287 ECI), available from Solartron analytical Co., Ltd.) was used.

For CV analysis, the electrolyte of the Ionic Liquid Polymer (4) (n=250) was prepared following Example 1 in a Teflon plate. Then, a free-standing polymer thin film (thickness: about 100 μm) was obtained, and was subsequently cut into a circular thin film of size of 19 cp. A coin-cell was prepared by disposing the circular thin film between a stainless-steel electrode, which is a working electrode and a lithium metal foil, which is a reference electrode. Current value changes of the coin-cell according to changes of potentials were measured, within a voltage range of about −0.5 V to about 6.5 V, at a scan rate of about 5 milli Volts per second (mV/sec), for three cycles.

Figure 6:
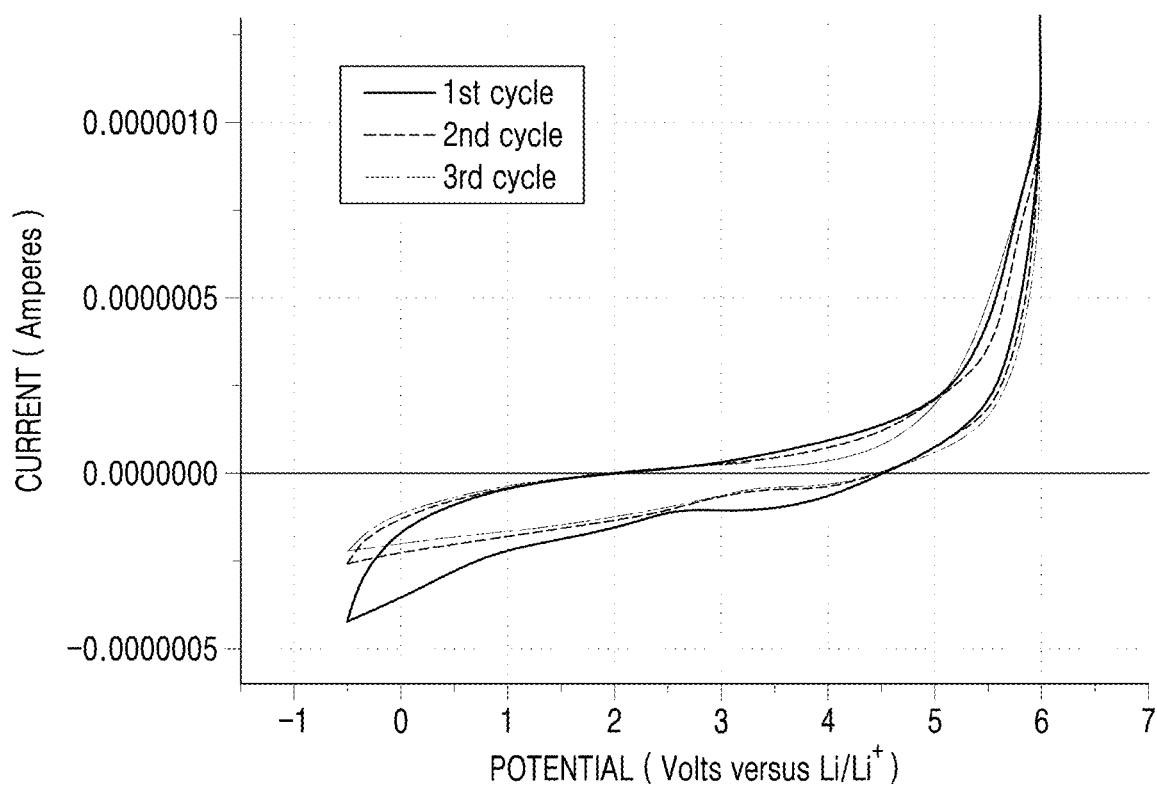
FIG. 6 is a graph of current (Amperes, A) versus potential versus Li/Li$^+$ (Volts, V) showing results of cyclic voltammetry (CV) analysis with regard to an electrolyte of an ionic liquid polymer prepared in Example 1.

Referring to FIG. 6, a stable and reversible oxidation/reduction peak without a particularly low or high peak was observed within a voltage range of about 0 Volts (V) to about 4.7 V (vs. Li/Li$^+$) during three cycles. Accordingly, it was found that the electrolyte of the Ionic Liquid Polymer (4) (n=250) prepared in Example 1 had excellent electrochemical stability, even at a high voltage of 3.5 V or higher, for example, in a range of about 3.8 V to about 4.7 V (vs. Li/Li$^+$).

Evaluation Example 2

Impedance Measurement-Interfacial Resistance and Ion Conductivity Evaluation

With regard to lithium secondary batteries (coin-cell) prepared in the same manner as in Examples 4 to 6 and Comparative Example 1, except that a lithium cobalt oxide electrode was used as working electrode, impedance changes according to changes of frequency of alternating current voltage were measured by using an impedance analyzer (Solartron 1260A Impedance/Gain-Phase Analyzer) at a temperature of about 25° C. The amplitude was about ±10 milli Volts (mV), and the frequency range was in a range of about 0.1 Hertz (Hz) to about 1 mega Hertz (MHz).

Figure 7:
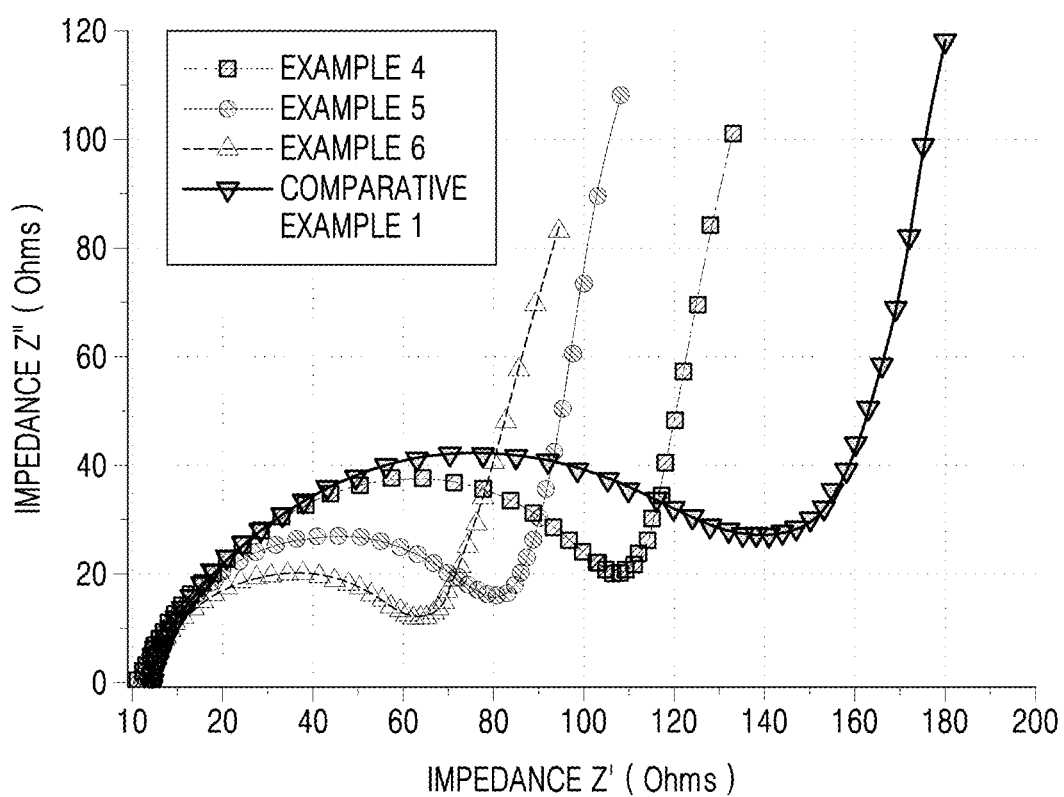
FIG. 7 is a graph of impedance Z" (ohms, Ω) versus impedance Z' (ohms, Ω) showing results of impedance measurements on lithium secondary batteries (coin-cell) prepared in Examples 4 to 6 and Comparative Example 1.

Impedance measurement results 24 hours after the preparation of the lithium secondary batteries (coin-cell) prepared in Examples 4 to 6 and Comparative Example 1 are shown in FIG. 7 as a Nyquist plot.

Referring to FIG. 7, the interfacial resistance of the electrode may be determined by the position and size of the semicircle. The difference between the left x side section and the right x side section of the semicircle indicates the interface resistance at the electrode. It was found that the interfacial resistances of the lithium secondary batteries (coin-cell) prepared in Examples 4 to 6 were about 42% lower than that of the lithium secondary battery (coin-cell) prepared in Comparative Example 1.

Further, resistance values of the electrode were obtained from the circular arc in the Nyquist plot according to the impedance measurement results, and ion conductivities were calculated following Mathematical Equation 1. The results thereof are shown in Table 2.

$$\sigma = l/R \cdot A \quad (\sigma: \text{ion conductivity}, R: \text{resistance}, l: \text{thickness of electrolyte (protective film)}, A: \text{electrode area})$$

Mathematical Equation 1

TABLE 2

| Classification | Ion conductivity (S/cm) |
|---|---|
| Example 4 | 3.45 × 10$^{-6}$ |
| Example 5 | 5.03 × 10$^{-6}$ |
| Example 6 | 6.26 × 10$^{-6}$ |
| Comparative Example 1 | 2.91 × 10$^{-6}$ |

Referring to Table 2, it was found that ion conductivities of the electrolytes in the lithium secondary batteries (coin-cell) prepared in Examples 4 to 6 was high compared to the electrolyte in the lithium secondary battery (coin-cell) prepared in Comparative Example 1 at a temperature of about 25° C.

Evaluation Example 3

Charging and Discharging Characteristics-Discharging Capacity, Coulomb Efficiency, and Lifespan Characteristics 3-1. Discharging Capacity Evaluation The lithium secondary batteries (coin-cell) prepared in Example 4 and Comparative Example 1 was charged with a constant current of 0.1 Coulomb (C) rate at a temperature of about 25° C. until the voltage of the cell reached about 4.40 V (vs. Li), followed by a cut-off at a current of about 0.05 C rate, while maintaining a voltage of about 4.40 V in a constant voltage mode. Afterward, the cell was discharged with a constant current of 0.1 C rate until the voltage reached 2.8 V (vs. Li) (Formation process, 1st cycle). Formation process was completed by repeating the charging and discharging two more times.

The lithium secondary batteries (coin-cell) that went through the formation process were charged with a constant current of 0.7 C rate at a temperature of about 25° C. at a voltage range of about 3.0 V to about 4.4 V (vs. Li), followed by discharging with a constant current of about 0.1 C/0.2 C/0.5 C/1.0 C/1.5 C/2.0 C until the voltage reached a cut-off value of 4.4 V. The results thereof are shown in FIG. 8 and Table 3.

TABLE 3

| Classification | @ 2.0 C $1^{st}$ discharging capacity (mAh/g) |
|---|---|
| Example 4 | 125 |
| Comparative Example 1 | 112 |

Figure 8:
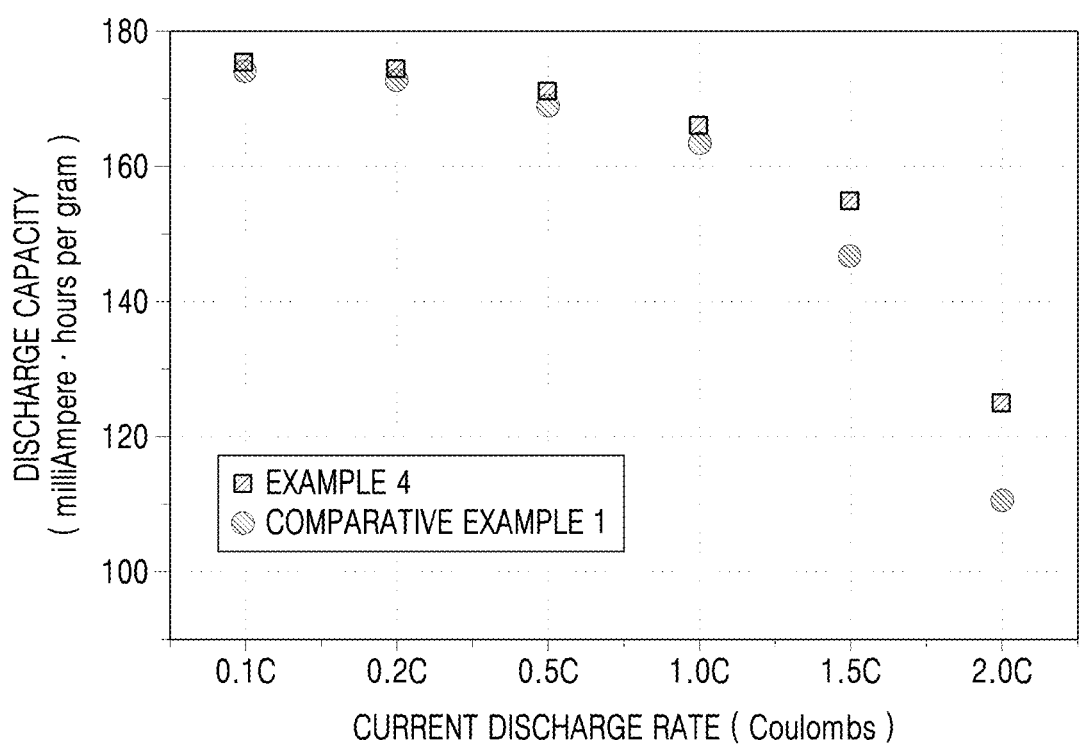
FIG. 8 is a graph of discharge capacity (milli Amperes hours per gram) versus C/D rate (Coulombs, C) showing results of discharging capacity evaluation on the lithium secondary batteries (coin-cell) prepared in Examples 4 and Comparative Example 1 that went through a formation process.

Referring to FIG. 8 and Table 3, it was found that the $1^{st}$ discharging capacity at 2.0 C of the lithium secondary battery (coin-cell) prepared in Example 4 improved compared to that of the lithium secondary battery (coin-cell) prepared in Comparative Example 1. In particular, the $1^{st}$ discharging capacity at 2.0 C of the lithium secondary battery (coin-cell) prepared in Example 4 had an improvement of about 13 milli Ampere hours per gram (mAh/g) compared to that of the lithium secondary battery (coin-cell) prepared in Comparative Example 1.

Such an improvement of the $1^{st}$ discharging capacity may be due to the improvement of ion conductivity of the lithium secondary battery (coin-cell) prepared in Example 4.

3-2. Coulomb Efficiency and Lifespan Characteristics Evaluation

Figure 9:
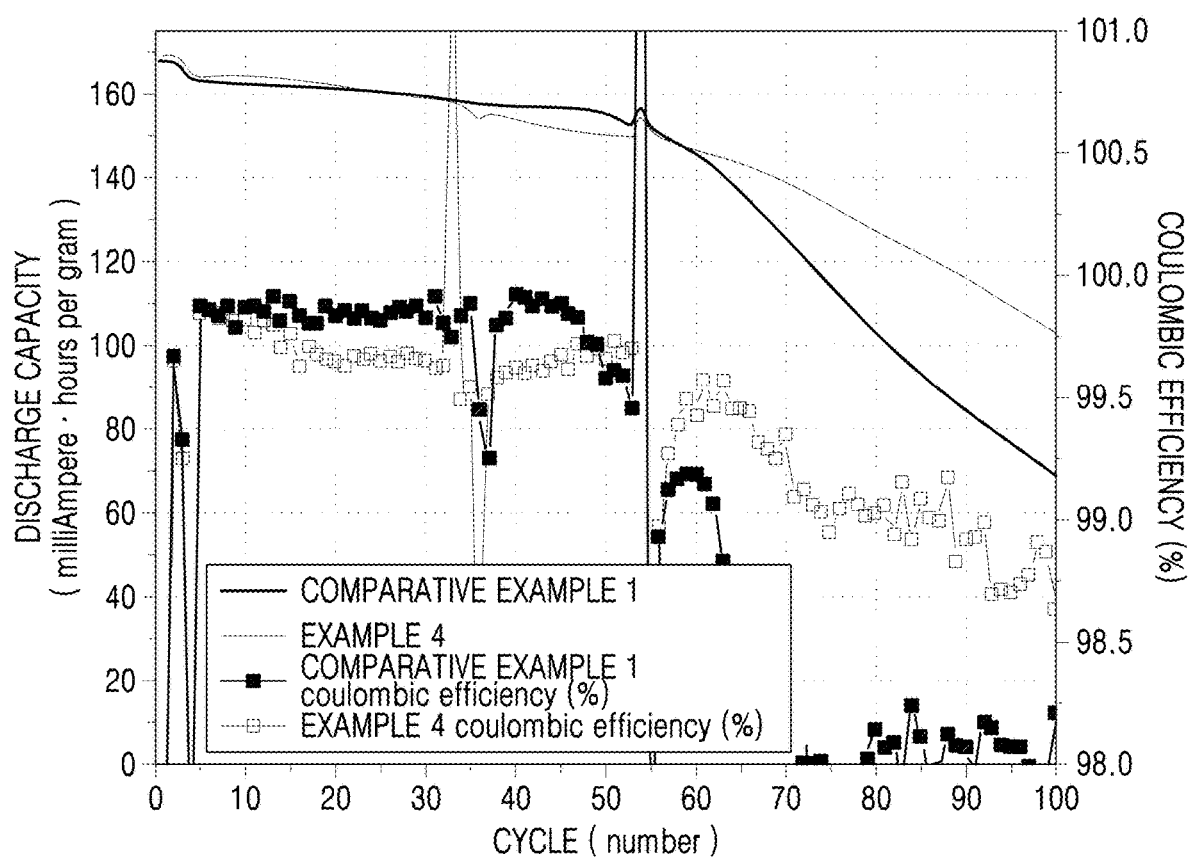
FIG. 9 is a graph of discharge capacity (milli Amperes hours per gram) versus number of cycles showing results of Coulomb efficiency and lifespan characteristics evaluation on the lithium secondary batteries (coin-cell) prepared in Examples 4 and Comparative Example 1 that underwent a formation process.

The lithium secondary batteries (coin-cell) prepared in Example 4 and Comparative Example 1 that went through the formation process, described in section 3-1 above, was charged with a constant current of 0.7 C at a temperature of about 25° C. at a voltage range of about 3.0 V to about 4.4 V (vs. Li). The lithium secondary batteries (coin-cell) were subsequently discharged with a constant current of about 30 milli Amperes (mA) until the voltage reached a cut-off voltage of about 4.4 V with a constant current of 0.5 C. The same charging and discharging process was repeated 99 µmes to perform total 100 µmes of charging and discharging cycles. The results thereof are shown in FIG. 9. A Coulomb efficiency and a cycle capacity retention rate were calculated by following the Mathematical Equation 2 and Mathematical Equation 3, respectively. The results thereof are shown in Table 4.

Coulomb efficiency (%)=[($100^{th}$ cycle discharging capacity/$100^{th}$ cycle charging capacity)× 100]　　　　Mathematical Equation 2

Cycle capacity retention rate (%)=[($100^{th}$ cycle discharging capacity//$1^{st}$ cycle discharging capacity)×100]　　　　Mathematical Equation 3

TABLE 4

| Classification | $100^{th}$ Coulomb efficiency (%) | $100^{th}$ Cycle capacity retention rate (%) |
|---|---|---|
| Example 4 | 98.6 | 62 |
| Comparative Example 1 | 98.0 | 43 |

Referring to FIG. 9 and Table 4, it was found that the $100^{th}$ Coulomb efficiency of the lithium secondary battery (coin-cell) prepared in Example 4 was about 4% higher than that of the lithium secondary battery (coin-cell) prepared in Comparative Example 1.

In addition, it was found that the $100^{th}$ Cycle capacity retention rate of the lithium secondary battery (coin-cell) prepared in Example 4 was about 57% higher than that of the lithium secondary battery (coin-cell) prepared in Comparative Example 1.

As described above, according to an exemplary embodiment, the electrolyte for a secondary battery may include the ionic liquid polymer including the repeating unit represented by Formula 1, improving the mechanical properties and ion conductivity at room temperature. In addition, the method of preparing the electrolyte may be readily carried out at room temperature. Furthermore, a secondary battery including the electrolyte may have improved electrochemical stability and charging and discharging characteristics.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments of the present inventive concept.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:
1. A secondary battery, comprising:
a positive electrode;
a negative electrode comprising a lithium metal or a lithium metal alloy; and
an electrolyte, wherein the electrolyte is disposed between the positive electrode and the negative electrode, and wherein the electrolyte is disposed on at least one portion of the negative electrode as a layer, a film, or a sheet, wherein the electrolyte comprise an ionic polymer comprising a repeating unit represented by Formula 1:

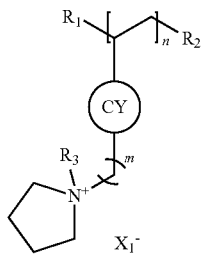

Formula 1 wherein, in Formula 1,

CY is selected from a substituted or unsubstituted non-fused 6-membered aromatic ring, a substituted or unsubstituted fused $C_{10}$-$C_{30}$ 6-membered aromatic ring, and a combination of at least two of the foregoing aromatic rings, wherein the at least two of the foregoing aromatic rings are linked through a single bond or a $C_1$-$C_{20}$ alkylene group;

$R_1$, $R_2$, and $R_3$ are each independently selected from a hydrogen atom, a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, an unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof, provided that $R_3$ is not an arylalkyl group substituted with a $C_2$ alkene;

n is an integer up to 5,000, and m is an integer selected from 1 to 1,000, wherein the ionic polymer has a weight average molecular weight from about 500 Daltons to about 1,000,000 Daltons; and $X_1^-$ is at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

2. The secondary battery of claim 1, wherein CY comprises 6-membered aromatic ring selected from a substituted or unsubstituted benzene ring, a substituted or unsubstituted naphthalene ring, a substituted or unsubstituted anthracene ring, a substituted or unsubstituted phenalene ring, a substituted or unsubstituted phenanthrene ring, a substituted or unsubstituted pyrene ring, a substituted or unsubstituted chrysene ring, a substituted or unsubstituted naphthacene ring, a substituted or unsubstituted picene ring, a substituted or unsubstituted pentaphene ring, and a substituted or unsubstituted hexacene ring, or a combination of at least two of the foregoing linked through a single bond or a $C_1$-$C_{20}$ alkylene group.

3. The secondary battery of claim 1, wherein m is an integer selected from 1 to 100.

4. The secondary battery of claim 1, wherein a weight average molecular weight of the ionic liquid polymer is in a range of about 10,000 Daltons to about 100,000 Daltons.

5. The secondary battery of claim 1, wherein the ionic liquid polymer is represented by Formula 2:

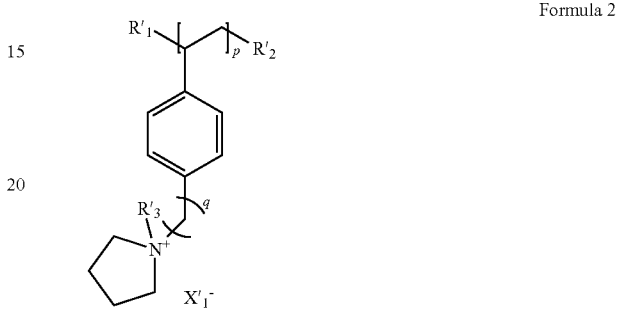

Formula 2 wherein, in Formula 2, $R_1'$, $R_2'$, and $R_3'$ are each independently selected from a hydrogen atom, a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, an unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof, provided that $R_3'$ is not an arylalkyl group substituted with a $C_2$ alkene;

p is an integer up to 500, q is an integer selected from 1 to 100, wherein a weight average molecular weight of the ionic liquid polymer is in a range of about 10,000 Daltons to about 1,000,000 Daltons; and $X_1^-$ is at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

6. The secondary battery of claim 1, wherein the electrolyte comprises at least one selected from an alkali metal salt and an alkaline earth metal salt.

7. The secondary battery of claim 6, wherein the at least one selected from an alkali metal salt and an alkaline earth metal salt comprises at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2CF_2CF_3)_2$, $LiSbF_6$, $LiPF_3(CF_2CF_3)_3$, $LiPF_3$ $(CF_3)_3$, $LiB(C_2O_4)_2$, NaSCN, $NaSO_3CF_3$, KTFSI, NaTFSI, $Ba(TFSI)_2$, $Pb(TFSI)_2$, and $Ca(TFSI)_2$.

8. The secondary battery of claim 6, wherein an amount of the alkali metal salt and the alkaline earth metal salt is in a range of about 0.01 part by weight to about 100 parts by weight based on 100 parts by weight of the ionic liquid polymer.

9. The secondary battery of claim 1, wherein the electrolyte further comprises at least one selected from a liquid electrolyte, a solid electrolyte, a gel electrolyte, a plurality of inorganic particles, and a separator.

10. A method of preparing an electrolyte for a secondary battery, the method comprising:
providing a monomer represented by Formula 3;
in-situ polymerizing the monomer represented by Formula 3 to obtain the electrolyte according to claim 1;

Formula 3

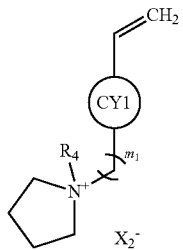

wherein, in Formula 3,
CY1 is selected from a substituted or unsubstituted non-fused 6-membered aromatic ring, a substituted or unsubstituted fused $C_{10}$-$C_{30}$ 6-membered aromatic ring, and a combination of at least two of the foregoing aromatic rings, wherein the at least two of the foregoing aromatic rings are linked through a single bond or a $C_1$-$C_{20}$ alkylene group;
$R_4$ is selected from a halogen atom, a cyano group, a hydroxy group, a substituted or unsubstituted $C_1$-$C_{20}$ alkyl group, a substituted or unsubstituted $C_1$-$C_{20}$ alkoxy group, a substituted or unsubstituted heteroalkyl group, a substituted or unsubstituted $C_3$-$C_{20}$ cycloalkyl group, a substituted or unsubstituted $C_3$-$C_{20}$ cycloalkyloxy group, a substituted or unsubstituted $C_3$-$C_{30}$ heterocycloalkyl group, a substituted or unsubstituted $C_6$-$C_{30}$ aryl group, a substituted or unsubstituted $C_7$-$C_{30}$ arylalkyl group, a substituted or unsubstituted $C_6$-$C_{30}$ aryloxy group, a substituted or unsubstituted $C_3$-$C_{30}$ heteroaryl group, a substituted or unsubstituted $C_4$-$C_{30}$ heteroarylalkyl group, a substituted or unsubstituted $C_3$-$C_{30}$ heteroaryloxy group, and a $C_2$-$C_{20}$ alkylene oxide group, and a combination thereof, provided that $R_4$ is not an arylalkyl group substituted with a $C_2$ alkene;
$m_1$ is an integer selected from 1 to 1,000; and
$X_2^-$ is at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

11. The method of claim 10, wherein the in-situ polymerizing comprises thermal in-situ polymerization or ultraviolet in-situ polymerization at room temperature.

12. The method of claim 10, wherein the electrolyte further comprises at least one selected from an alkali metal salt and an alkaline earth metal salt.

13. The method of claim 12, wherein the at least one selected from an alkali metal salt and an alkaline earth metal salt comprises at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2CF_2CF_3)_2$, $LiSbF_6$, $LiPF_3(CF_2CF_3)_3$, $LiPF_3(CF_3)_3$, $LiB(C_2O_4)_2$, NaSCN, $NaSO_3CF_3$, KTFSI, NaTFSI, $Ba(TFSI)_2$, $Pb(TFSI)_2$, and $Ca(TFSI)_2$.

14. The method of claim 12, wherein an amount of the alkali metal salt and the alkaline earth metal salt is in a range of about 0.01 part by weight to about 100 parts by weight based on 100 parts by weight of the monomer for forming an ionic liquid polymer.

15. The secondary battery of claim 1, wherein the electrolyte further comprises at least one selected from a liquid electrolyte, a solid electrolyte, a gel electrolyte, a plurality of inorganic particles, and a separator.

16. The secondary battery of claim 1, wherein a thickness of the layer, the film, or the sheet is in a range of about 0.1 micrometer to about 100 micrometers.

17. The secondary battery of claim 1, wherein an operation potential of the secondary battery is in a range of about −0.1 Volts to about 4.5 Volts versus $Li/Li^+$.

* * * * *